United States Patent
Ehara et al.

(10) Patent No.: US 6,556,233 B2
(45) Date of Patent: Apr. 29, 2003

(54) ELECTROPHOTOGRAPHIC APPARATUS AND ELECTROPHOTOGRAPHIC METHOD FEATURING A PHOTOSENSITIVE MEMBER HAVING A LINEAR EV CHARACTERISTIC

(75) Inventors: Toshiyuki Ehara, Yokohama (JP); Yuji Nakayama, Yokohama (JP); Masaya Kawada, Mishima (JP); Hironori Owaki, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/394,049

(22) Filed: Sep. 13, 1999

(65) Prior Publication Data

US 2001/0040619 A1 Nov. 15, 2001

(30) Foreign Application Priority Data

Sep. 17, 1998 (JP) .......................................... 10-263464

(51) Int. Cl.$^7$ ................................................ B41J 27/00
(52) U.S. Cl. ...................................................... 347/260
(58) Field of Search ................................. 347/243, 259, 347/260, 261, 134, 232; 359/204, 212, 216, 217, 226; 430/57.1, 57.4, 57.5, 95, 57.6

(56) References Cited

U.S. PATENT DOCUMENTS

| | | | |
|---|---|---|---|
| 3,558,208 A | | 1/1971 | Hudson ........................ 359/888 |
| 4,700,201 A | | 10/1987 | Sato ............................. 347/247 |
| 4,720,443 A | * | 1/1988 | Saitoh et al. ................ 430/57.6 |
| 5,278,691 A | * | 1/1994 | Kessler ......................... 359/216 |
| 5,430,472 A | * | 7/1995 | Curry ............................ 347/232 |
| 5,631,687 A | * | 5/1997 | Tanaka ......................... 347/134 |
| 5,757,535 A | * | 5/1998 | Ichikawa ...................... 359/216 |
| 5,774,251 A | * | 6/1998 | Sekikawa ..................... 359/216 |
| 5,945,241 A | * | 8/1999 | Niino et al. .................. 430/57.4 |

FOREIGN PATENT DOCUMENTS

| | | |
|---|---|---|
| EP | 0 604 031 | 6/1994 |
| JP | 54-83746 | 7/1979 |
| JP | 57-11556 | 1/1982 |
| JP | 57-158650 | 9/1982 |
| JP | 60-35059 | 2/1985 |
| JP | 60-67951 | 4/1985 |
| JP | 60-95551 | 5/1985 |
| JP | 60-168156 | 8/1985 |
| JP | 60-178457 | 9/1985 |
| JP | 60-226854 | 11/1985 |
| JP | 61-231561 | 10/1986 |
| JP | 62-103657 | 5/1987 |
| JP | 62-168161 | 7/1987 |
| JP | 4-73658 | 3/1992 |
| JP | 6-95551 | 4/1994 |
| JP | 9-297464 | 11/1997 |

* cited by examiner

Primary Examiner—Hai Pham
(74) Attorney, Agent, or Firm—Fitzpatrick, Cella, Harper & Scinto

(57) ABSTRACT

An electrophotographic apparatus has a light scanning device for guiding a light beam onto a rotary polygon mirror and deflecting the light beam; and a recording medium which the light beam deflected by the light scanning device scans to form an image. The recording medium is an a-Si base photosensitive member. The electrophotographic apparatus satisfies a relation represented by Eq. (I) below;

$$3.0 \geq D/W \geq 1.5 \qquad (I)$$

where D is a diameter of the light beam at a reflecting surface of the rotary polygon mirror and W is a width in a main scanning direction of a deflecting surface of the rotary polygon mirror.

14 Claims, 12 Drawing Sheets

ELECTROPHOTOGRAPHIC APPARATUS AND ELECTROPHOTOGRAPHIC METHOD FEATURING A PHOTOSENSITIVE MEMBER HAVING A LINEAR EV CHARACTERISTIC

BACKGROUND OF THE INVENTION

1. Field of the Invention

The present invention relates to an electrophotographic apparatus and an electrophotographic method and, more particularly, to an electrophotographic apparatus provided with an optical scanner for scanning an area on a recording medium with a light beam deflected by a light reflection type deflector, such as laser beam printers, laser copiers, laser facsimile machines, and so on, and an electrophotographic method carried out by the apparatus.

2. Related Background Art

In recent years laser printers are drawing attention because of such characteristics thereof as good quality of image, quick printout, and so on. The performance of scanning the area on the recording medium while deflecting a laser beam in the laser printers considerably affects the performance of the image quality, print speed, etc. of the laser printers.

As illustrated in FIG. 1, an optical scanner is normally composed of a laser diode 100, a rotary polygon mirror 102, a light-source optical system 104 for guiding a laser beam emitted from the laser diode 100 to the rotary polygon mirror 102, and a scanning optical system 108 for guiding the laser beam deflected by the rotary polygon mirror 102 to a recording medium 106 to scan it.

Relations between the rotary polygon mirror and the incident beam are generally classified under two types described below. The first type is an optical system of a type in which the width D of the incident light beam L is narrower than the width W of one reflecting facet 112A of the rotary polygon mirror 112 and in which all the incident light beam L is guided to the scanning lens (which will be referred to hereinafter as an underfield type optical system or UFS), as illustrated in FIG. 2.

The second type is an optical system of an overexposure type in which the width D of the incident light beam L is wider than the width W of one reflecting facet 112A of the rotary polygon mirror 112 (which will be referred to hereinafter as an overfield type optical system or OFS), as illustrated in FIG. 3.

Assuming that the same scanning lens is used, the overfield optical system is characterized by lower rotational speed of a motor etc., because the diameter of the rotary polygon mirror in the overfield optical system can be lower than that in the underfield optical system. However, because the incident beam is cut down in part to be directed toward the scanning lens, amounts of emerging light differ depending upon positions on the recording medium, which poses a problem of the locally different densities of image or the like.

To overcome the problem, U.S. Pat. No. 3,558,208 suggests that a light amount distribution of the light beam L is preliminarily shaped by a transmittance-distributed filter 126 before incidence of the incident beam to the rotary polygon mirror 112, as illustrated in FIG. 4, so as to make light amounts of emerging rays toward the scanning lens 128 constant. This device, however, had the problems of the increased number of parts, increased cost, etc. because of the use of the special filter.

On the other hand, it is known that inconsistency of the light beam reflected by one reflecting facet 112A of the rotary polygon mirror 112 can be reduced by increasing the width of the light beam L incident to the rotary polygon mirror 112 by the light-source optical system, as illustrated in FIG. 5.

Further, image forming methods of the electrophotographic apparatus of the digital type are generally classified under two types described below, as to relations between image information and exposed part. The first type is an image exposure method for exposing image areas to light (hereinafter referred to as IAE) and the second type is a background exposure method for exposing nonimage areas (background areas) to light (hereinafter referred to as BAE).

BAE is the same image forming method as that used in the electrophotographic apparatus of the analog type and thus has the merit of permitting component sharing of development, cleaning, developer, etc. with the electrophotographic apparatus of the analog type.

On the other hand, IAE requires inversion development with a developer of opposite polarity in order to gain a normal image.

Both types are put in practical use, and in many cases either one of them is determined according to restrictions such as a photosensitive member, the developer, etc. used.

A variety of developing methods, including one-component development, two-component brush development, and so on, are devised or adopted according to the needs, such as monochrome or color, or the like, and it is understood in general that image reproduction characteristics in the two-component brush development are superior to those in the one-component development. However, they have their respective features.

The principal features of the developing methods are as follows; (a) the image characteristics of the BMT method and the FEED method (one component, electrically insulative, magnetic, contact), particularly, the image characteristics of the FEED method, are approximately equivalent to those of the two component brush development; (b) the touchdown method (one component, electrically insulative, nonmagnetic, contact) has the problem of fog due to contact development; (c) the jumping method (one component, electrically insulative, magnetic, noncontact) seldom suffers the problems of fog and scratches because of noncontact; (d) the projection method (one component, electrically insulative, nonmagnetic, noncontact) rarely experiences the problems of fog and scratches because of noncontact and permits application to color image formation because of the non-magnetic property; (e) the magnedynamic method (one component, electrically conductive, magnetic, contact) involves inductive charging by a latent-image electric field and brush development to permit development of either positive or negative latent image, but transfer is difficult; (f) the IMB method (two components, electrically insulative, nonmagnetic, contact) suffers storage of charge of opposite polarity after the development because of its electrically insulative carrier, and reproducibility is not good in solid areas but is good in fine lines; (g) the CMB method (two components, electrically conductive, nonmagnetic, contact) has good reproducibility of solid areas without storage of the opposite polarity charge after the development because of its electrically conductive carrier, but reproducibility is inferior in fine lines of low density; and so on.

In general, the development is a trade-off between fog and density and the latitude thereof considerably affects the developing performance. The latitude of BAE is wider than that of IAE.

On the other hand, the transfer-separation performance is greatly influenced by the transfer efficiency and the latitude of separation and retransfer, and the latitude of BAE is wider than that of IAE, because in IAE the potential at the nonimage areas (background areas) is higher than that at the image areas.

Since the potential of the photosensitive member is decreased at rush into the cleaning, a lot of developer is likely to attach to the photosensitive member in the cleaning section in the case of the IAE which is the developing method of lower-potential portions and, therefore, the latitude of BAE is also wider as to the cleaning than that of IAE.

As described above, BAE has the potential of easier design and, as a result, the potential of capability of supplying stable electrophotographic apparatus with wide latitude.

BAE, however, has a drawback of narrower latitude in image recording by scanning with the laser beam than IAE, as described below.

In the image recording technology by the laser beam scanning, it is generally known that the size, shape, power, etc. of the laser spot greatly affect the image quality and stability.

Particularly, in the laser beam printers based on electrophotography, a latent image is formed by exposing a uniform surface potential distribution obtained by charging to the laser beam so as to decay it, so that the shape of this laser spot affects the distribution created thereby.

In IAE, the laser beam is radiated to recording image areas (portions to become black) to decay the surface potential there and the developer is deposited onto the potential-lowered portions.

Therefore, where the laser spot diameter is large relative to the spacing of scanning lines or where the laser power is too large, the line widths of characters and lines become thicker and defaced. In BAE the laser beam is radiated to the background areas (portions not to become black) to decay the surface potential there, and the developer-deposited areas are high-potential regions where the surface potential is not decayed.

Therefore, when the laser spot diameter is large relative to the spacing of scanning lines or when the laser power is too large, the line widths of characters and lines become thinner and blurred. Therefore, there are upper limits of the laser spot diameter and power in each of the image forming methods.

In FIG. 6, the left side part shows a state of one line in IAE, i.e., a laser-on state of only one line, and the right side part shows a state of one line in BAE, i.e., a laser-off state of only one line, in which the latitude of IAE is $V_D$-$V_i$, and the latitude of BAE is $V_b$-$V_2$.

As apparent from this figure, in the case of BAE, when the laser spot diameter is small relative to the spacing of scanning lines or when the laser power is too small, a potential gap appears in the laser-radiated portions and $V_2$ becomes higher, which decreases the latitude. Therefore, there are lower limits of the laser spot diameter and power against the scanning line spacing. Namely, it is known that the latitude of BAE is narrower than that of IAE.

It is thus necessary in each of the image forming methods to set the optimum laser spot diameter and power.

FIG. 7 shows the relationship among the optical energy distribution of the light beam, the photosensitivity characteristic of the photosensitive member, and the surface potential distribution on the photosensitive member. It is seen from this FIG. 7 that when the photosensitivity characteristic (EV curve) of the photosensitive member is linear, the optical energy distribution of the light beam is reflected by the surface potential distribution on the photosensitive member as it is.

The photosensitive members are roughly classified under two types, organic type and inorganic type. (Organic photoconductors (OPC)).

In recent years, various organic photoconductive materials have been developed heretofore as photoconductive materials for electrophotographic, photosensitive members and, particularly, function-separated photosensitive members in which a charge generating layer and a charge transporting layer are stacked are already put in practical use and are mounted on the copiers and laser beam printers.

It has been considered, however, that these photosensitive members normally had one significant drawback of low durability. The durability is generally classified in durability in terms of physical properties of electrophotography such as sensitivity, residual potential, chargeability, image blur, etc. and mechanical durability such as wear, scratches, etc. of the surface of the photosensitive member due to scrubbing, each of which is a significant factor to determine the lifetime of the photosensitive member.

Among them, as to the durability in terms of the physical properties of electrophotography, particularly, as to the image blur, it is known that active substances such as ozone, NOx, etc. evolving from the corona charger are the cause of deteriorating the charge transporting substance contained in the surface layer of the photosensitive member.

As to the mechanical durability, it is known that the deterioration is caused by scrubbing of the photosensitive layer in physical contact with a cleaning member such as a blade and/or a roller or the like, the toner, and so on.

In order to enhance the durability in terms of the physical properties of electrophotography, it is important to use the charge transport substance resistant to the deterioration due to the active substances such as ozone, NOx, etc. and it is known practice to select the charge transport substance having a high oxidation potential. In order to enhance the mechanical durability, it is important to decrease friction by increasing lubricity of the surface so as to resist scrubbing by paper and the cleaning member, and to enhance the releasing property of the surface so as to prevent filming fusion of toner or the like, and it is known practice to blend a lubricating material such as fluororesin powder, graphite fluoride, polyolefin base resin powder, or the like in the surface layer.

However, extreme decrease of wear posed the problem that moisture-absorbing substances produced by the active substances such as ozone, NOx, etc. were deposited on the surface of the photosensitive member and it resulted in decreasing the surface resistance and causing lateral motion of the surface charge to induce so-called image flow.

On the other hand, as to the sensitivity, the organic photosensitive members normally have electric field dependence originating in the principle of carrier conduction and the potential characteristics against exposure amount (abscissas: exposure amounts and ordinates: potentials, which will be referred to hereinafter as EV characteristics) are convex down as illustrated in FIG. 14; therefore, light amount changes in a small light amount range are readily reflected by potentials. As described, since they form the potential distribution of a bowl type as against the light amount distribution of the Gaussian distribution, they had the problem that variations in the light amount at the base of the light amount distribution greatly affected change of dot diameter, so as to affect the image quality readily.

Further, since it is necessary to wear the photosensitive member in long-term use for the above reason, the sensitivity, i.e., the EV characteristics vary in long-term use. There was thus also the problem that unsharpness of dots occurred due to optical scattering caused by change of the surface shape with wear.

In the electrophotography, the photoconductive materials for forming the photosensitive layer in the photosensitive member are required to have such properties as high sensitivity, high S/N ratio, i.e., photocurrent (Ip)/dark current (Id), possession of an absorption spectrum matched with the spectral characteristics of the electromagnetic wave radiated, quick optical response, possession of desired dark resistance, harmlessness to human bodies in use, and so on.

Particularly, in the case of the photosensitive members for image forming apparatus incorporated in the image forming apparatus used as business machines in offices, the nonpolluting property in use, as described above, is a significant factor. Hydrogenated amorphous silicon (hereinafter referred to as "a-Si:H") is a photoconductive material excellent in this point and, for example, Japanese Patent Publication No. 60-35059 describes an application thereof to the photosensitive member for image forming apparatus.

The photosensitive members for image forming apparatus using a-Si:H are fabricated normally by heating a conductive support at 50 to 400° C. and depositing a photoconductive layer of a-Si on the support by a film forming method such as vacuum evaporation, sputtering, ion plating, thermal CVD, photo-CVD, plasma enhanced CVD, or the like. Among them, a preferred method employed in practice is the plasma enhanced CVD, which is a method for decomposing source gas by dc or high-frequency or microwave glow discharge to form an a-Si deposited film on the support.

Japanese Patent Application Laid-Open No. 54-83746 suggests a photosensitive member for image forming apparatus comprised of the conductive support and the photoconductive layer containing halogen atoms as a constituent element (hereinafter referred to as "a-Si:X"). This Japanese application describes that the photoconductive layer of the photosensitive member for image forming apparatus can have high heat resistance and good electrical and optical characteristics when it is made of a-Si containing halogen atoms 1 to 40 atomic %.

Japanese Patent Application Laid-Open No. 57-11556 describes such technology that a surface layer made of a nonphotoconductive, amorphous material containing silicon atoms and carbon atoms is provided on the photoconductive layer made of an amorphous material containing silicon atoms as a matrix in order to improve the electrical, optical, and photoconductive properties such as the dark resistance, photosensitivity, optical response, etc., operating environment properties such as moisture resistance etc., and aging stability of the photoconductive member having the photoconductive layer made of the a-Si deposited film.

Further, Japanese Patent Application Laid-Open No. 60-67951 describes the technology about the photosensitive member in which a transparent, insulating, overcoat layer containing amorphous silicon, carbon, oxygen, and fluorine is overlaid, and Japanese Patent Application Laid-Open No. 62-168161 describes such technology that the surface layer is made of an amorphous material containing silicon atoms, carbon atoms, and hydrogen atoms 41 to 70 atomic % as constituent elements.

Further, Japanese Patent Application Laid-Open No. 57-158650 describes that a high-sensitivity and high-resistance photosensitive member for image forming apparatus can be obtained by making the photoconductive layer of a-Si:H containing hydrogen 10 to 40 atomic % and having absorption coefficient ratios of absorption peaks of 0.2 to 1.7 at 2100 $cm^{-1}$ and at 2000 $cm^{-1}$ in an infrared absorption spectrum.

On the other hand, Japanese Patent Application Laid-Open No. 60-95551 discloses the technology for preventing the decrease of surface resistance due to adsorption of water at the surface of the photosensitive member and the image flow occurring therewith by carrying out the image forming steps of charging, exposure, development, and transfer while keeping the temperature near the surface of the photosensitive member at 30 to 40° C., in order to improve the image quality of the amorphous silicon photosensitive member.

These technologies have improved the electrical, optical, and photoconductive properties and the operating environment properties of the photosensitive members for image forming apparatus, and the image quality has been also improved therewith.

The emission distribution of the laser is an approximate Gaussian distribution in one dot and in UFS all the laser beam reaches the drum surface as it is. Therefore, the potential was apt to reflect the light amount change in the small light amount region in OPC having the EV shape convex down as described above, so that UFS had the problem that with variations in light amounts at the base of the Gaussian distribution the dot diameters fluctuated, so as to affect the image quality.

Particularly, as the dot diameters become smaller and smaller with progress in enhancement of image quality, the effect of the dot diameter fluctuations on the image quality becomes significant, to constitute hindrance to the enhancement of image quality.

Further, it is preferable to employ BAE having higher latitude and higher stability, for designing the electrophotographic apparatus, but BAE requires setting of the optimum laser spot diameter and power at higher accuracy than IAE, because there are the upper and lower limits of the laser spot diameter and power against the scanning line spacing as described above.

There was, however, a limit of high-accuracy setting in the assembling step of the practical electrophotographic apparatus and there sometimes occurred the dot diameter fluctuations due to variations in laser emission, depending upon the setting conditions.

SUMMARY OF THE INVENTION

An object of the present invention is to provide an excellent electrophotographic apparatus whose dot diameter and image quality are less affected with light amount change at the base of the Gaussian distribution when the electrophotographic apparatus is constructed using the overfield type optical system and whose setting latitude is wide, and also provide an electrophotographic method carried out in the apparatus.

The above object is accomplished by the electrophotographic apparatus and electrophotographic method according to the present invention. The present invention can be summarized as follows; the electrophotographic apparatus using the overfield type optical system and a-Si having the linear EV characteristics, wherein the surface of the rotary polygon mirror is set at a position where the spot light amount distribution is expanded, thereby using only a portion of relatively stable light amounts near the center of the spot light amount distribution.

Specifically, the electrophotographic apparatus is provided with an optical scanning device for guiding a light beam onto a rotary polygon mirror and deflecting the incident light beam and the electrophotographic apparatus is characterized by using an a-Si base photosensitive member and satisfying the relation of $3.0 \geq D/W \geq 1.5$, where D is a diameter of the light beam at a reflecting surface of the rotary polygon mirror and W is a width in a main scanning direction of a deflecting surface of the rotary polygon mirror.

Further, the electrophotographic method is carried out with an optical scanning device for guiding a light beam onto a rotary polygon mirror and deflecting the incident light beam and the electrophotographic method is characterized by using an a-Si base photosensitive member and satisfying the relation of $3.0 \geq D/W \geq 1.5$, where D is a diameter of the light beam at a reflecting surface of the rotary polygon mirror and W is a width in a main scanning direction of a deflecting surface of the rotary polygon mirror.

The above described structure makes it possible to form a stable dot latent image with little potential fluctuations (fluctuations of dot diameter) even if there are variations in light amounts at the base of the light amount distribution. Further, use of OFS make it possible to make compact the rotary polygon mirror. Therefore, the apparatus can operate at high speed and can achieve very good matching with a-Si having the high durability. Further, since in BAE the affect of instable dot latent image on the image quality is more prominent, the affect of the present invention can be demonstrated better in BAE.

On the other hand, since angles of the light beam incident to the surface of the photosensitive member differ because of the principle of scanning of the light beam by the rotary polygon mirror, there appears a light amount distribution (field angle characteristics) in the axial direction on the surface of the photosensitive member. However, the field angle characteristics can be controlled by the thickness and/or quality of film by use of the a-Si photosensitive member having a coherent surface layer, because interference changes the amount of incident light.

DETAILED DESCRIPTION OF THE PREFERRED EMBODIMENTS

Embodiments of the present invention will be specifically described in detail by reference to the accompanying drawings.

FIGS. 8A to 8D are schematic, structural diagrams for explaining the layer structures of the photosensitive members for image forming apparatus according to the present invention.

Figure 8A:
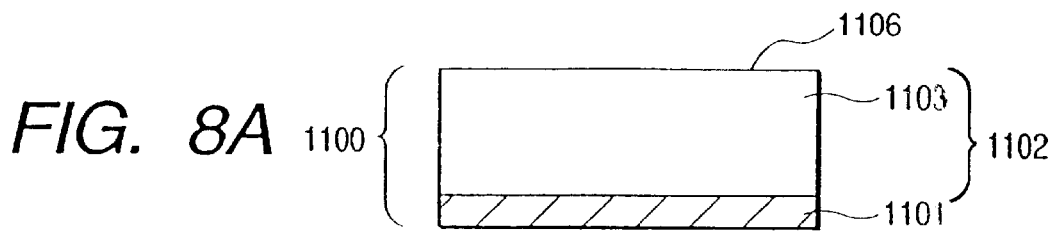
FIGS. 8A, 8B, 8C and 8D are schematic, explanatory diagrams to show layer structures of photosensitive members for image forming apparatus according to the present invention.

The photosensitive member 1100 for image forming apparatus illustrated in FIG. 8A is formed in such structure that a photosensitive layer 1102 is provided on a support 1101 for photosensitive member. The photosensitive layer 1102 is comprised of a photoconductive layer 1103 made of a-Si:H,X and having a photoconductive property.

Figure 8B:
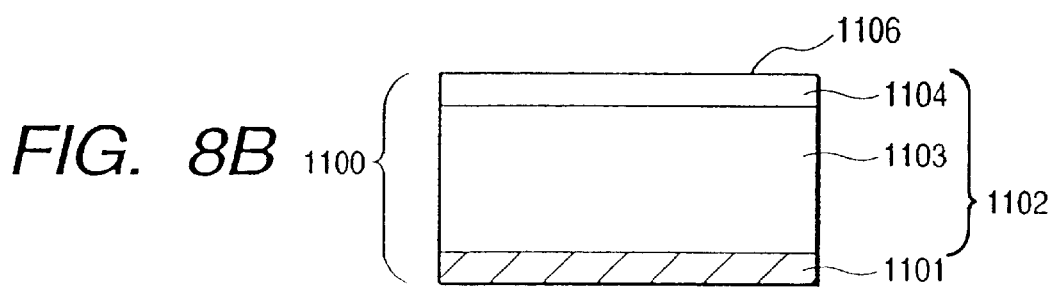

FIG. 8B is a schematic, structural diagram for explaining another layer structure of the photosensitive member for image forming apparatus according to the present invention. The photosensitive member 1100 for image forming apparatus illustrated in FIG. 8B is constructed in such structure that the photosensitive layer 1102 is provided on the support 1101 for photosensitive member. The photosensitive layer 1102 is comprised of the photoconductive layer 1103 made of a-Si:H,X and having a photoconductive property and an amorphous silicon base surface layer 1104.

Figure 8C:
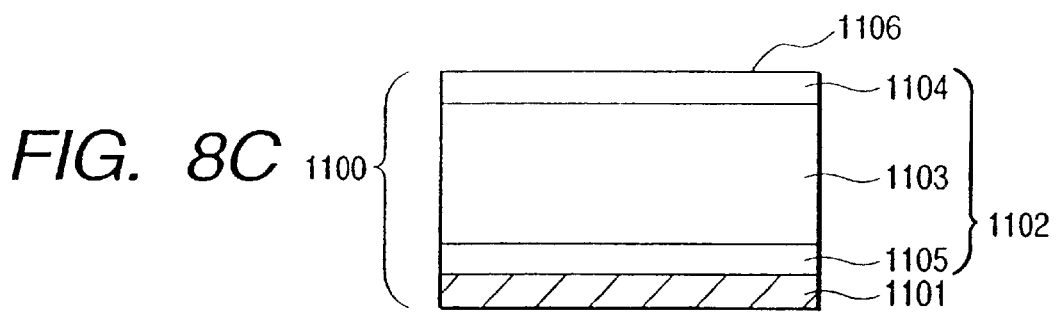

FIG. 8C is a schematic, structural diagram for explaining another layer structure of the photosensitive member for image forming apparatus according to the present invention.

The photosensitive member 1100 for image forming apparatus illustrated in FIG. 8C is constructed in such structure that the photosensitive layer 1102 is provided on the support 1101 for photosensitive member. The photosensitive layer 1102 is comprised of the photoconductive layer 1103 made of a-Si:H,X and having the photoconductive property, the amorphous silicon base surface layer 1104, and an amorphous silicon base charge injection inhibiting layer 1105.

Figure 8D:
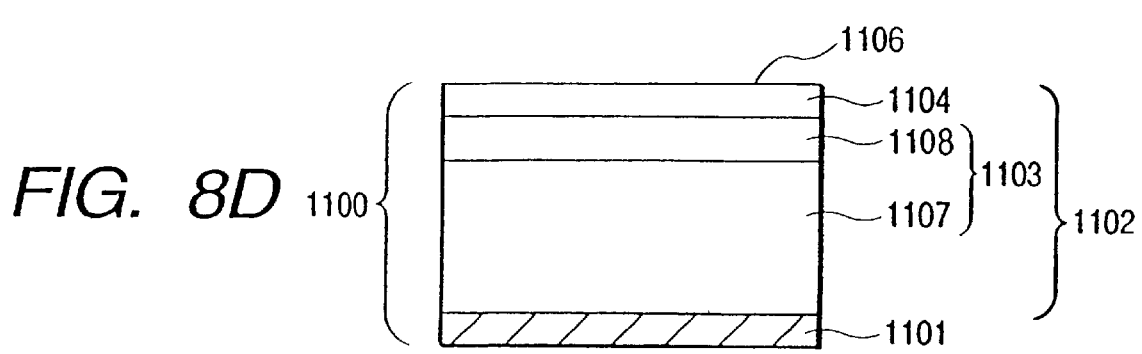

FIG. 8D is a schematic, structural diagram for explaining still another layer structure of the photosensitive member for image forming apparatus according to the present invention. The photosensitive member 1100 for image forming apparatus illustrated in FIG. 8D is constructed in such structure that the photosensitive layer 1102 is provided on the support 1101 for photosensitive member. The photosensitive layer 1102 is comprised of a charge generating layer 1108 and a charge transport layer 1107 of a-Si:H,X constituting the photoconductive layer 1103, and the amorphous silicon base surface layer 1104.

The support used in the present invention may be either electrically conductive or electrically insulative. Examples of materials for the conductive support include metals such as Al, Cr, Mo, Au, In, Nb, Te, V, Ti, Pt, Pd, Fe, and so on, and alloys of these metals, for example such as stainless steel or the like.

The support can also be one obtained by an electric conduction treatment of a surface at least on the side where the photosensitive layer is formed, in one selected from films or sheets of synthetic resins such as polyester, polyethylene, polycarbonate, cellulose acetate, polypropylene, polyvinyl chloride, polystyrene, polyamide, and so on, and electrically insulating supports of glass, ceramics, or the like.

The shape of the support 1101 used in the present invention can be a cylindrical or sheetlike endless belt shape of a smooth surface or an uneven surface, and the thickness of the support can be determined properly so as to permit formation of the desired photosensitive member 1100 for image forming apparatus. When the photosensitive member 1100 for image forming apparatus is required to have flexibility, the support 1101 can be made as thin as possible within a scope wherein it can demonstrate the function as a support well. However, the thickness of the support 1101 is normally not less than 10 $\mu$m in terms of production, handling, mechanical strength, and so on.

Particularly, where image recording is carried out using coherent light such as a laser beam or the like, the surface of the support 1101 may be provided with unevenness within the range wherein there is no substantial decrease in charging carriers, in order to effectively cancel an image defect due to the so-called interference fringe pattern appearing in a visible image. The unevenness provided in the surface of the support 1101 is formed by known methods, for example, described in Japanese Patent Applications Laid-Open Nos. 60-168156, 60-178457, 60-226854, and so on.

Another method for effectively canceling the image defect due to the interference fringe pattern in the use of the coherent light such as the laser beam or the like is to form the unevenness as a plurality of spherical trace indentations in the surface of the support 1101 within the range wherein there is no substantial decrease in charging carriers. Namely, the surface of the support 1101 has the finer unevenness than the resolving power required for the photosensitive member 1100 for image forming apparatus and the unevenness is formed as the plurality of spherical trace indentations.

The unevenness as the plurality of spherical trace indentations provided in the surface of the support 1101 is formed by a known method described in Japanese Patent Application Laid-Open No. 61-231561.

Still another method for effectively canceling the image defect due to the interference fringe pattern in the use of the coherent light such as the laser beam or the like is to provide the inside of the photosensitive layer 1102 or the lower side of the layer 1102 with an interference preventing layer or region such as a light absorbing layer or the like.

In the present invention, in order to effectively accomplish the object thereof, the photoconductive layer 1103 composing a part of the photosensitive layer 1102, which is formed on the support 1101 or on an undercoat layer (not illustrated) as occasion may demand, is formed by a vacuum deposition forming method while numerical conditions of film forming parameters are properly set so as to achieve the desired characteristics. Specifically, it can be formed by various thin film deposition methods, for example, such as glow discharge methods (ac discharge CVD methods such as low-frequency CVD, high-frequency CVD, or microwave CVD, dc discharge CVD methods, etc.), sputtering, vacuum evaporation, ion plating, photo-CVD, thermal CVD, and so on.

Either one is properly selected out of these thin film deposition methods, depending upon factors including the production conditions, loads under capital investment for facilities, production scale, the desired characteristics for the photosensitive member for image forming apparatus formed, and so on. Among them, preferred methods are the glow discharge methods, because control is relatively easy for the conditions for producing the photosensitive member for image forming apparatus having the desired characteristics, and particularly preferred methods are the high-frequency glow discharge methods using the power-supply frequency in the RF band or in the VHF band.

In the formation of the photoconductive layer 1103 by the glow discharge method, basically, the source gas for supply of Si capable of supplying silicon atoms (Si), and the source gas for supply of H capable of supplying hydrogen atoms (H) or/and the source gas for supply of X capable of supplying halogen atoms (X) are introduced in a desired gas state into a reaction vessel the inside of which can be depressurized, and glow discharge is induced in the reaction vessel, whereby a layer of a-Si:H,X is deposited on the predetermined support 1101 preliminarily set at a predetermined position.

In the present invention, the photoconductive layer 1103 needs to contain the hydrogen atoms or/and halogen atoms, which are necessary and indispensable for compensating for unbound bonds of silicon atoms and for improving the quality of layer, particularly, for enhancing the photoconductive property and charge holding characteristics. The content of the hydrogen atoms or halogen atoms, or the total amount of the hydrogen atoms and halogen atoms is preferably 10 to 30 atomic % and more preferably 15 to 25 atomic % over the sum of silicon atoms and the hydrogen atoms or/and halogen atoms.

Substances that can be the Si-supplying gases, used in the present invention, are gaseous or gasifiable silicon hydrides (silanes) such as $SiH_4$, $Si_2H_6$, $Si_3H_8$, $Si_4H_{10}$, and the like, which can be used effectively. Preferred materials are $SiH_4$ and $Si_2H_6$ in terms of ease of handling during formation of the layer, high Si supply efficiency, and so on.

It is necessary to form the layer by further mixing a desired amount of $H_2$ and/or He, or a gas of a silicon compound containing hydrogen atoms into the above-stated gases in order to structurally introduce hydrogen atoms into the photoconductive layer 1103 to be formed, further facilitate control of the ratio of hydrogen atoms introduced, and obtain the film characteristics to accomplish the object of the present invention. Each gas may not be only a single species, but may also be a mixture of plural species at a predetermined mixture ratio.

Preferred examples of materials effectively used as the source gas for supply of halogen atoms in the present invention include gaseous or gasifiable halogen compounds such as halogen gases, halogenides, interhalogen compounds of halogen elements, silane derivatives substituted by halogen, and so on. In addition, further materials effectively used are gaseous or gasifiable silicon hydride compounds containing halogen atoms, components of which are silicon atoms and halogen atoms.

The halogen compounds that can be preferably used in the present invention are fluorine gas $F_2$, and the interhalogen compounds such as BrF, ClF, $ClF_3$, $BrF_3$, $BrF_5$, $IF_3$, $IF_7$, and so on. Preferred examples of the silicon compounds containing halogen atoms, which are so called the silane derivatives substituted by halogen atoms, are silicon fluorides, for example, such as $SiF_4$ and $Si_2F_6$.

The amount of the hydrogen atoms or/and halogen atoms contained in the photoconductive layer 1103 can be controlled, for example, by controlling the temperature of the support 1101, the introduced amount of the raw material for inclusion of the hydrogen atoms or/and halogen atoms into the reaction vessel, the discharge power, and so on.

It is preferable in the present invention to make the photoconductive layer 1103 contain atoms for controlling the electroconductive property as occasion may demand. The atoms for controlling the electroconductive property may be homogeneously distributed all over in the photoconductive layer 1103 or may be heterogeneously distributed in part in the direction of the thickness.

Examples of the atoms for controlling the electroconductive property are so-called impurities in the semiconductor field and they can be selected from the atoms belonging to Group IIIb of the periodic table to provide the p-type conduction property (hereinafter abbreviated as "IIIb atoms") or the atoms belonging to Group Vb of the periodic table to provide the n-type conduction property (hereinafter abbreviated as "Vb atoms").

Specific examples of the IIIb atoms include boron B, aluminum Al, gallium Ga, indium In, thallium Tl, and so on, among which B, Al, and Ga are particularly suitable.

Specific examples of the Vb atoms are phosphorus P, arsenic As, antimony Sb, bismuth Bi, and so on, among which P and As are particularly suitable.

The content of the atoms for controlling the electroconductive property, contained in the photoconductive layer 1103, is preferably $1\times10^{-2}$ to $1\times10^4$ atomic ppm, more preferably $5\times10^{-2}$ to $5\times10^3$ atomic ppm, and most preferably $1\times10^{-1}$ to $1\times10^3$ atomic ppm.

The atoms for controlling the electroconductive property, for example, the IIIb atoms or the Vb atoms, can be structurally introduced by introducing the raw material for introduction of the IIIb atoms or the raw material for introduction of the Vb atoms in a gaseous state, together with the other gases for formation of the photoconductive layer 1103, into the reaction vessel on the occasion of formation of the layer. The raw material for introduction of the IIIb atoms or the raw material for introduction of the Vb atoms is desirably a gaseous material at ordinary temperature and ordinary pressure or a material that can be readily gasified at least under the film-forming conditions.

Specific examples of the raw material for introduction of the IIIb atoms, e.g. for introduction of boron atoms, include boron hydrides such as $B_2H_6$, $B_4H_{10}$, $B_5H_9$, $B_5H_{11}$, $B_6H_{10}$, $B_6H_{12}$, and $B_6H_{14}$, boron halides such as $BF_3$, $BCl_3$, and $BBr_3$, and so on. Further examples include $AlCl_3$, $GaCl_3$, $Ga(CH_3)_3$, $InCl_3$, $TlCl_3$, and so on.

Specific examples of the raw material effectively used for introduction of the Vb atoms, e.g. for introduction of phosphorus atoms, are phosphorus hydrides such as $PH_3$ and $P_2H_4$, phosphorus halides such as $PH_4I$, $PF_3$, $PF_5$, $PCl_3$, $PCl_5$, $PBr_3$, $PBr_5$, and $PI_3$, and so on. Further examples of the raw material that can be effectively used as a starting substance for introduction of the Vb atoms include $AsH_3$, $AsF_3$, $AsCl_3$, $AsBr_3$, $AsF_5$, $SbH_3$, $SbF_3$, $SbF_6$, $SbCl_3$, $SbCl_6$, $BiH_3$, $BiCl_3$, $BiBr_3$, and so on.

These raw materials for introduction of the atoms for controlling the electroconductive property may be used as diluted with $H_2$ and/or He if necessary.

Further, it is also effective in the present invention to make the photoconductive layer 1103 contain carbon atoms and/or oxygen atoms and/or nitrogen atoms. The content of the carbon atoms and/or oxygen atoms and/or nitrogen atoms is preferably $1\times10^{-5}$ to 10 atomic %, more preferably $1\times10^{-4}$ to 8 atomic %, and most preferably $1\times10^{-3}$ to 5 atomic % over the sum of silicon atoms, carbon atoms, oxygen atoms, and nitrogen atoms. The photoconductive layer 1103 may contain the carbon atoms and/or oxygen atoms and/or nitrogen atoms in a homogeneously distributed state all over or may have a heterogeneously distributed portion of such atoms in which contents vary in the direction of the thickness of the photoconductive layer.

In the present invention, the thickness of the photoconductive layer 1103 is properly determined according to the desire to achieve the aspects of obtaining the desired electrophotographic characteristics, economical effect, and so on, and is preferably 20 to 50 µm, more preferably 23 to 45 µm, and most preferably 25 to 40 µm.

For forming the photoconductive layer 1103 with the desired film characteristics while accomplishing the object of the present invention, it is necessary to properly set a mixture ratio of the gas for supply of Si with a dilution gas, the pressure of the gas inside the reaction vessel, the discharge power, and the support temperature.

The optimum range of flow rate of $H_2$ and/or He used as a dilution gas is properly selected according to the design of the layer, and $H_2$ and/or He is controlled normally in the range of 3 to 20 times, preferably in the range of 4 to 16 times, and most preferably in the range of 6 to 10 times the gas for supply of Si.

The optimum range of the gas pressure inside the reaction vessel is also properly selected similarly according to the design of the layer and is normally $1\times10^{-4}$ to 10 Torr, preferably $5\times10^{-4}$ to 5 Torr, and most preferably $1\times10^{-3}$ to 1 Torr.

The optimum range of the discharge power is also properly selected similarly according to the design of the layer, and the discharge power per flow rate of the gas for supply of Si is set normally in the range of 2 to 7 times, preferably in the range of 2.5 to 6 times, and most preferably in the range of 3 to 5 times.

Further, the optimum range of the temperature of the support 1101 is also properly selected according to the design of the layer and a desirable range thereof is normally 200 to 350° C., more preferably 230 to 330° C., and most preferably 250 to 310° C.

In the present invention, the above-stated ranges can be listed as desired numerical ranges of the support temperature and gas pressure for formation of the photoconductive layer, but the conditions, normally, cannot be determined independent of each other. It is thus desirable to determine the optimum values, based on mutual and organic relation so as to form the photosensitive member with the desired characteristics.

It is preferable in the present invention to further form the amorphous silicon base surface layer 1104 on the photoconductive layer 1103 formed on the support 1101 as described above. This surface layer 1104 has a free surface 1106 and is provided mainly for accomplishing the object of the present invention in the moisture resistance, continuous and repetitive operation characteristics, withstanding voltage, operating environment characteristics, and durability.

In the present invention, since each of the amorphous materials forming the photoconductive layer 1103 and the surface layer 1104 constituting the photosensitive layer 1102 has the common component of silicon atoms, chemical stability is assured sufficiently at the interface between the layers.

The surface layer 1104 can be made of any amorphous silicon base material, and examples of preferred materials therefor are amorphous silicon containing hydrogen atoms (H) and/or halogen atoms (X) and further containing carbon atoms (hereinafter referred to as "a-SiC:H,X"), amorphous silicon containing hydrogen atoms (H) and/or halogen atoms (X) and further containing oxygen atoms (hereinafter referred to as "a-SiO:H,X"), amorphous silicon containing hydrogen atoms (H) and/or halogen atoms (X) and further containing nitrogen atoms (hereinafter referred to as "a-SiN:H,X"), amorphous silicon containing hydrogen atoms (H) and/or halogen atoms (X) and further containing at least one of carbon, oxygen, and nitrogen (hereinafter referred to as "a-SiCON:H,X"), and so on.

In the present invention, in order to accomplish the object thereof effectively, the surface layer 1104 is made by a vacuum deposition forming method while the numerical conditions of the film-forming parameters are properly set so as to obtain the desired characteristics.

Specifically, it can be formed by various thin film deposition methods, for example, such as glow discharge methods (ac discharge CVD methods such as low-frequency CVD, high-frequency CVD, or microwave CVD, dc discharge CVD methods, etc.), sputtering, vacuum evaporation, ion plating, photo-CVD, thermal CVD, and so on.

Either one is properly selected out of these thin film deposition methods, depending upon the factors including the production conditions, loads under capital investment for facilities, production scale, the desired characteristics for the photosensitive member for image forming apparatus formed, and so on. The surface layer 1104 is preferably formed by the deposition method equivalent to that of the photoconductive layer from the aspect of productivity of the photosensitive member.

For example, when the surface layer 1104 is made of a-SiC:H,X by the glow discharge method, basically, the source gas for supply of Si capable of supplying silicon atoms Si, the source gas for supply of C capable of supplying carbon atoms C, and the source gas for supply of H capable of supplying hydrogen atoms H or/and the source gas for supply of X capable of supplying halogen atoms X are introduced in a desired gas state into the reaction vessel the inside of which can be depressurized, and the glow discharge is induced in the reaction vessel, whereby the layer of a-SiC:H,X is made on the support 1101 having the photoconductive layer 1103 thereon, which was preliminarily set at the predetermined position.

The surface layer used in the present invention can be made of any amorphous material containing silicon, but a preferred compound for the surface layer is one with silicon atoms including at least one element selected from carbon, nitrogen, and oxygen. Further, a particularly preferred material is a compound the principal component of which is a-SiC.

When the surface layer is made of a material having the matrix of a-SiC, the amount of carbon is preferably in the range of 30% to 90% over the sum of silicon atoms and carbon atoms.

In the present invention the surface layer 1104 needs to contain hydrogen atoms or/and halogen atoms, which are necessary and indispensable for compensating for the unbound bonds of silicon atoms and enhancing the quality of the layer, particularly, for enhancing the photoconductive property and charge retaining characteristics.

The hydrogen content is normally 30 to 70 atomic %, preferably 35 to 65 atomic %, and most preferably 40 to 60 atomic % over the total amount of the component atoms. The content of fluorine atoms is normally 0.01 to 15 atomic %, preferably 0.1 to 10 atomic %, and most preferably 0.6 to 4 atomic %.

The photosensitive members formed in these ranges of hydrogen and/or fluorine content can be applied well as much superior members, which were not available heretofore in practice. Namely, it is known that defects present in the surface layer (which are mainly dangling bonds of silicon atoms and carbon atoms) negatively affect the characteristics of the photosensitive member for image forming apparatus.

Examples of such negative effects include degradation of the charging characteristics due to injection of charge from the free surface into the photoconductive layer, variations in the charging characteristics due to change of surface structure under the operating circumstances, for example, under high humidity, occurrence of the after-image phenomenon during repetitive use for the reason that the charge is injected from the photoconductive layer into the surface layer during the corona charging or during light irradiation and the charge is trapped in the defects in the surface layer, and so on.

However, the defects in the surface layer can be decreased remarkably by controlling the hydrogen content in the surface layer to not less than 30 atomic %, so that drastic improvement can be achieved in the electric characteristics and the high-speed continuous operability, as compared with the apparatus before.

On the other hand, if the hydrogen content in the surface layer is not less than 71 atomic %, the hardness of the surface layer will be too low to endure repetitive use.

Therefore, control of the hydrogen content in the surface layer within the aforementioned range is one of the extremely important factors for achieving the extremely excellent desired electrophotographic property. The hydrogen content in the surface layer can be controlled by the flow rate of $H_2$ gas, the support temperature, the discharge power, the gas pressure, and so on.

Generation of bonds between silicon atoms and carbon atoms in the surface layer can be achieved more effectively by controlling the fluorine content in the surface layer within the range of not less than 0.01 atomic %. Further, the fluorine atoms in the surface layer can serve to effectively prevent cleavage of bonds between silicon atoms and carbon atoms due to damage from corona or the like.

On the other hand, if the fluorine content in the surface layer exceeds 15 atomic %, there will appear little such effects as the effect of generation of bonds between silicon atoms and carbon atoms in the surface layer and the effect of preventing the cleavage of bonds between silicon atoms and carbon atoms. Further, excessive fluorine atoms will impede mobility of the carriers in the surface layer, so that the residual potential and image memory will become prominent.

Therefore, the control of the the fluorine content in the surface layer within the aforementioned range is one of important factors for a accomplishing the desired electrophotographic property. The hydrogen content in the surface layer can be controlled by the flow rate of $H_2$ gas, the support temperature, the discharge power, the gas pressure, etc., similarly as the hydrogen content was.

Substances that can be effectively used as a gas for supply of silicon Si in formation of the surface layer of the present invention are gaseous or gasifiable silicon hydrides (silanes) such as $SiH_4$, $Si_2H_6$, $Si_3H_8$, $Si_4H_{10}$, and the like, among which preferred substances are $SiH_4$ and $Si_2H_6$ in terms of ease to handle during production of the layer, high Si supply efficiency, and so on. These source gases for supply of Si can also be used as diluted with a gas such as $H_2$, He, Ar, or Ne if necessary.

Substances that can be effectively used as a gas for supply of carbon are gaseous or gasifiable hydrocarbons such as $CH_4$, $C_2H_6$, $C_3H_8$, $C_4H_{10}$, and so on, among which preferred hydrocarbons are $CH_4$ and $C_2H_6$ in terms of ease to handle during production of the layer, high C supply efficiency, and so on. These source gases for supply of C can also be used as diluted with a gas such as $H_2$, He, Ar, or Ne if necessary.

Substances that can be effectively used as a gas for supply of nitrogen or oxygen are gaseous or gasifiable compounds such as $NH_3$, NO, $N_2O$, $NO_2$, $H_2O$, $O_2$, Co, $CO_2$, $N_2$ and so on. These source gases for supply of nitrogen or oxygen can also be used as diluted with a gas such as $H_2$, He, Ar, or Ne if necessary.

For further facilitating the control of the introduction ratio of hydrogen atoms introduced into the surface layer 1104 to be formed, it is preferable to form the layer by further mixing a desired amount of hydrogen gas or gas of a silicon compound containing hydrogen atoms with these gases. Each gas may not be only a single species but may also be a mixture of several species at a predetermined mixture ratio.

Preferred examples effectively used as the source gas for a supply of halogen atoms include gaseous or gasifiable halogen compounds such as halogen gases, halogenides, interhalogen compounds of halogen elements, silane derivatives substituted by halogen, and so on. In addition, further materials effectively used are gaseous or gasifiable silicon hydride compounds containing halogen atoms, components of which are silicon atoms and halogen atoms.

Specifically, the halogen compounds that can be preferably used in the present invention are fluorine gas $F_2$, and the interhalogen compounds such as BrF, ClF, $ClF_3$, $BrF_3$, $BrF_5$, $IF_3$, $IF_7$, and so on. Preferred examples of the silicon compounds containing halogen atoms, which are so called the silane derivatives substituted by halogen atoms, are, specifically, silicon fluorides, for example, such as $SiF_4$ and $Si_2F_6$.

The amount of the hydrogen atoms or/and halogen atoms contained in the surface layer 1104 can be controlled, for example, by controlling the temperature of the support 1101, the introduced amount of the raw material for inclusion of the hydrogen atoms or/and halogen atoms into the reaction vessel, the discharge power, and so on.

The carbon atoms or/and oxygen atoms or/and nitrogen atoms may be homogeneously distributed all over in the surface layer or may be heterogeneously distributed in part with varying contents in the direction of the thickness of the surface layer.

It is preferable in the present invention to make the surface layer 1104 contain the atoms for controlling the electroconductive property as occasion may demand. The atoms for controlling the electroconductive property may be homogeneously distributed all over in the surface layer 1104 or may be heterogeneously distributed in part in the direction of thickness of the surface layer.

Examples of the atoms for controlling the electroconductive property are the so-called impurities in the semiconductor field and they can be selected from the atoms of Group IIIb of the periodic table to provide the p-type conduction property or the atoms of Group Vb of the periodic table to provide the n-type conduction property.

Specific examples of the IIIb atoms include boron B, aluminum Al, gallium Ga, indium In, thallium Tl, and so on, among which B, Al, and Ga are particularly suitable.

Specific examples of the Vb atoms are phosphorus P, arsenic As, antimony Sb, bismuth Bi, and so on, among which P and As are particularly suitable.

The content of the atoms for controlling the electroconductive property, contained in the surface layer 1104, is preferably $1 \times 10^{-3}$ to $1 \times 10^3$ atomic ppm, more preferably $1 \times 10^{-2}$ to $5 \times 10^2$ atomic ppm, and most preferably $1 \times 10^{-1}$ to $1 \times 10^2$ atomic ppm.

The atoms for controlling the electroconductive property, for example, the IIIb atoms or the Vb atoms, can be structurally introduced by introducing the raw material for introduction of the IIIb atoms or the raw material for introduction of the Vb atoms in a gas state, together with the other gases for formation of the surface layer 1104, into the reaction vessel on the occasion of formation of the layer.

The raw material for introduction of the IIIb atoms or the raw material for introduction of the Vb atoms is desirably a gaseous material at ordinary temperature and ordinary pressure or a material that can be readily gasified at least under the film-forming conditions.

Specific examples of the raw material for introduction of the IIIb atoms, e.g. for introduction of boron atoms, include boron hydrides such as $B_2H_6$, $B_4H_{10}$, $B_5H_9$, $B_6H_{10}$, $B_6H_{12}$, $B_6H_{14}$, and the like, boron halides such as $BF_3$, $BCl_3$, $BBr_3$, and the like, and so on. Further examples include $AlCl_3$, $GaCl_3$, $Ga(CH_3)_3$, $InCl_3$, $TlCl_3$, and so on.

Specific examples of the raw material effectively used for introduction of the Vb atoms, e.g. for introduction of phosphorus atoms, are phosphorus hydrides such as $PH_3$ and $P_2H_4$, phosphorus halides such as $PH_4I$, $PF_3$, $PF_5$, $PCl_3$, $PCl_5$, $PBr_3$, $PBr_5$, and $PI_3$, and so on.

Further examples of the raw material that can be effectively used as a starting substance for introduction of the Vb atoms include $AsH_3$, $AsF_3$, $AsCl_3$, $AsBr_3$, $SbH_3$, $SbF_5$, $SbCl_5$, $BiH_3$, $BiCl_3$, $BiBr_3$, and so on.

These raw materials for introduction of the atoms for controlling the electroconductive property may be used as diluted with a gas such as $H_2$, He, Ar, Ne, or the like if necessary.

The thickness of the surface layer 1104 in the present invention is normally 0.01 to 3 $\mu$m, preferably 0.05 to 2 $\mu$m, and most preferably 0.1 to 1 $\mu$m. If the thickness of the layer is smaller than 0.01 $\mu$m the surface layer will be lost for the reason of wear or the like during operation. If the thickness is over 3 μm degradation will occur in the electrophotographic characteristics, such as increase of the residual potential or the like.

The surface layer 1104 of the present invention is carefully formed so as to achieve its required characteristics as desired. Specifically, the substances whose components are Si, C and/or N and/or O, and H and/or X, can structurally take any morphology from crystal to amorphism, depending upon their forming conditions, and electrophysically demonstrate the properties ranging from the electroconductive property to the semiconductive property and electrically insulating property and also demonstrate the properties from the photoconductive property to the nonphotoconductive property. In the present invention, therefore, the forming conditions of the surface layer are precisely selected according to the desire to form a compound having the desired characteristics according to the purpose.

For example, when the surface layer 1104 is provided for the principal purpose of improving the withstanding voltage, it is made of a non-monocrystalline material exhibiting prominent, electrically insulating behavior in the operating circumstances.

When the surface layer 1104 is provided for the principal purpose of improving the continuous and repetitive operating characteristics and the operating circumstance characteristics, it is made of a non-monocrystalline material having some sensitivity to light radiated while the degree of the aforementioned electrically insulating property is relaxed to some extent.

Further, in the charging mechanism according to the present invention, it is preferable to properly control the resistance of the layer in formation thereof in order to prevent the image flow due to low resistance of the surface layer or in order to prevent the influence of the residual potential or the like, and in order to achieve good charging efficiency.

For forming the surface layer 1104 with the characteristics to accomplish the object of the present invention, it is necessary to properly set the temperature of the support 1101 and the pressure of the gas in the reaction vessel according to the desire.

The optimum range of the temperature (Ts) of the support 1101 is properly selected according to the design of the layer and, normally, preferably 200 to 350° C., more preferably 230 to 330° C., and most preferably 250 to 300° C.

The optimum range of the gas pressure in the reaction vessel is also properly selected similarly according to the design of the layer and, normally, preferably $1 \times 10^{-4}$ to 10 Torr, more preferably $5 \times 10^{-4}$ to 6 Torr, and most preferably $1 \times 10^{-3}$ to 1 Torr.

In the present invention, the desired numerical ranges of the support temperature and gas pressure for forming the surface layer are the aforementioned ranges, but the conditions, normally, cannot be determined independent of each other. It is desirable to determine the optimum values, based on mutual and organic relation so as to form the photosensitive member with the desired characteristics.

Further, in the present invention, it is effective to provide a blocking layer (lower surface layer) having lower contents of carbon atoms, oxygen atoms, and nitrogen atoms than the surface layer, between the photoconductive layer and the surface layer, in order to enhance the characteristics of chargeability etc. more.

It may also be contemplated that a region with continuously decreasing contents of carbon atoms and/or oxygen atoms and/or nitrogen atoms toward the photoconductive layer 1103 is provided between the surface layer 1104 and the photoconductive layer 1103. This can enhance the adhesion between the surface layer and the photoconductive layer and can relieve the influence of interference due to reflection of light at the interface.

In the photosensitive member for image forming apparatus of the present invention, it is more effective to provide the charge injection inhibiting layer, which functions to inhibit the charge from being injected from the conductive support, between the conductive support and the photoconductive layer.

More specifically, the charge injection inhibiting layer has the function to inhibit the charge from being injected from the support side into the photoconductive layer when the photosensitive member is charged in fixed polarity in the free surface; but the inhibiting layer does not demonstrate this function when the photosensitive member is charged in the opposite polarity. Therefore, the inhibiting layer has so-called polarity dependence.

For providing the inhibiting layer with such function, the charge injection inhibiting layer is made to contain a relatively larger amount of the atoms for controlling the electrical conduction property than the photoconductive layer does.

The atoms for controlling the electroconductive property, contained in the inhibiting layer, may be homogeneously distributed all over in the layer or may be heterogeneously distributed in part, though contained all over, in the direction of the thickness. In the case of the heterogeneous concentration distribution, it is preferable to distribute more atoms on the support side.

In either case, it is, however, necessary to distribute the atoms homogeneously and all over in the in-plane directions parallel with the surface of the support, from the aspect of uniforming the characteristics in the in-plane directions.

The atoms for controlling the electroconductive property, contained in the charge injection inhibiting layer, can be the so-called impurities in the semiconductor field. The atoms for controlling the electroconductive property can be selected from the atoms of Group IIIb of the periodic table to provide the p-type conduction property or the atoms of Group Vb of the periodic table to provide the n-type conduction property.

Specific examples of the IIIb atoms include B (boron), Al (aluminum), Ga (gallium), In (indium), Tl (thallium), and so on, among which B, Al, and Ga are particularly suitable. Specific examples of the Vb atoms are P (phosphorus), As (arsenic), Sb (antimony), Bi (bismuth), and so on, among which P and As are particularly suitable.

The content of the atoms for controlling the electroconductive property, contained in the charge injection inhibiting layer in the present invention, is properly determined according to the desire so as to accomplish the object of the present invention effectively, and is preferably 10 to $1 \times 10^4$ atomic ppm, more preferably 50 to $5 \times 10^3$ atomic ppm, and most preferably $1 \times 10^2$ to $1 \times 10^3$ atomic ppm.

Further, the charge injection inhibiting layer is allowed to contain at least one of carbon, nitrogen, and oxygen, whereby the adhesion is further enhanced between the charge injection inhibiting layer and the other layers provided in direct contact therewith.

The carbon atoms or nitrogen atoms or oxygen atoms contained in the inhibiting layer may be homogeneously distributed all over in the layer or may be heterogeneously distributed in part, though contained all over, in the direction of the thickness.

In either case, it is, however, necessary to distribute the atoms homogeneously and all over in the in-plane directions parallel with the surface of the support, from the aspect of uniforming the characteristics in the in-plane directions.

The content of the carbon atoms and/or nitrogen atoms and/or oxygen atoms, contained in the entire region of the charge injection inhibiting layer in the present invention, is properly determined so as to effectively accomplish the object of the present invention, but the content, which is, in the case of one kind, the amount thereof or which is, in the case of two or more kinds, the sum thereof, is preferably $1 \times 10^{-3}$ to 50 atomic %, more preferably $5 \times 10^{-3}$ to 30 atomic %, and most preferably $1 \times 10^{-2}$ to 10 atomic %.

The hydrogen atoms and/or halogen atoms contained in the charge injection inhibiting layer in the present invention have the effect of compensating for the unbound bonds existing in the layer to improve the quality of the film. The content of the hydrogen atoms or halogen atoms or the total amount of hydrogen atoms and halogen atoms in the charge injection inhibiting layer is preferably 1 to 50 atomic %, more preferably 5 to 40 atomic %, and most preferably 10 to 30 atomic %.

The thickness of the charge injection inhibiting layer in the present invention is preferably 0.1 to 5 $\mu$m, more preferably 0.3 to 4 $\mu$m, and most preferably 0.5 to 3 $\mu$m, from the aspect of achieving the desired electrophotographic characteristics, economical effect, and so on.

The vacuum deposition method, similar to the method for forming the photoconductive layer as described above, is employed for formation of the charge injection inhibiting layer in the present invention.

Just as in the case of the photoconductive layer 1103, it is necessary to properly set the mixture ratio of the gas for supply of Si with the dilution gas, the pressure of the gas in the reaction vessel, the discharge power, and the temperature of the support 1101 in order to form the charge injection inhibiting layer 1105 having the characteristics capable of accomplishing the object of the present invention.

The optimum range of flow rate of $H_2$ and/or He as a dilution gas is properly selected according to the design of the layer, and $H_2$ and/or He is desired to be controlled normally in the range of 1 to 20 times, preferably in the range of 3 to 15 times, and most preferably in the range of 5 to 10 times the gas for supply of Si.

The optimum range of the gas pressure in the reaction vessel is also properly selected similarly according to the design of the layer, and the pressure is determined normally in the range of $1 \times 10^{-4}$ to 10 Torr, preferably in the range of $5 \times 10^{-4}$ to 5 Torr, and most preferably in the range of $1 \times 10^{-3}$ to 1 Torr.

The optimum range of the discharge power is also properly selected similarly according to the design of the layer and the discharge power per flow rate of the gas for supply of Si is desirably to be set normally in the range of 1 to 7 times, preferably in the range of 2 to 6 times, and most preferably in the range of 3 to 5 times.

Further, the optimum range of the temperature of the support 1101 is also selected according to the design of the layer and is normally desired to be set preferably in the range of 200 to 350° C., more preferably in the range of 230 to 330° C., and most preferably in the range of 250 to 300° C.

In the present invention, the desired numerical ranges of the mixture ratio of the dilution gas, the gas pressure, the discharge power, and the support temperature for forming the charge injection inhibiting layer can be the aforementioned ranges, but these layer production factors, normally, cannot be determined independent of each other. Therefore, it is desirable to determine the optimum value of each layer production factor, based on mutual and organic relation so as to form the inhibiting layer having the desired characteristics.

Besides, the photosensitive member for image forming apparatus according to the present invention is desirably provided with a layer region containing at least aluminum atoms, silicon atoms, hydrogen atoms, or/and halogen atoms in a heterogeneous distribution state in the direction of the thickness on the side of the aforementioned support 1101 of the photosensitive layer 1102.

For the purpose of further enhancing the adhesion between the support 1101 and the photoconductive layer 1103 or the charge injection inhibiting layer 1105, the photosensitive member for image forming apparatus of the present invention may be provided with a contact layer, for example, made of an amorphous material or the like containing the matrix of $Si_3N_4$, $SiO_2$, SiO, or silicon atoms and also containing hydrogen atoms and/or halogen atoms and carbon atoms and/or oxygen atoms and/or nitrogen atoms. Further, the photosensitive member may also be provided with a light absorbing layer for preventing occurrence of the interference pattern due to reflected light from the support, as described above.

Figure 9:
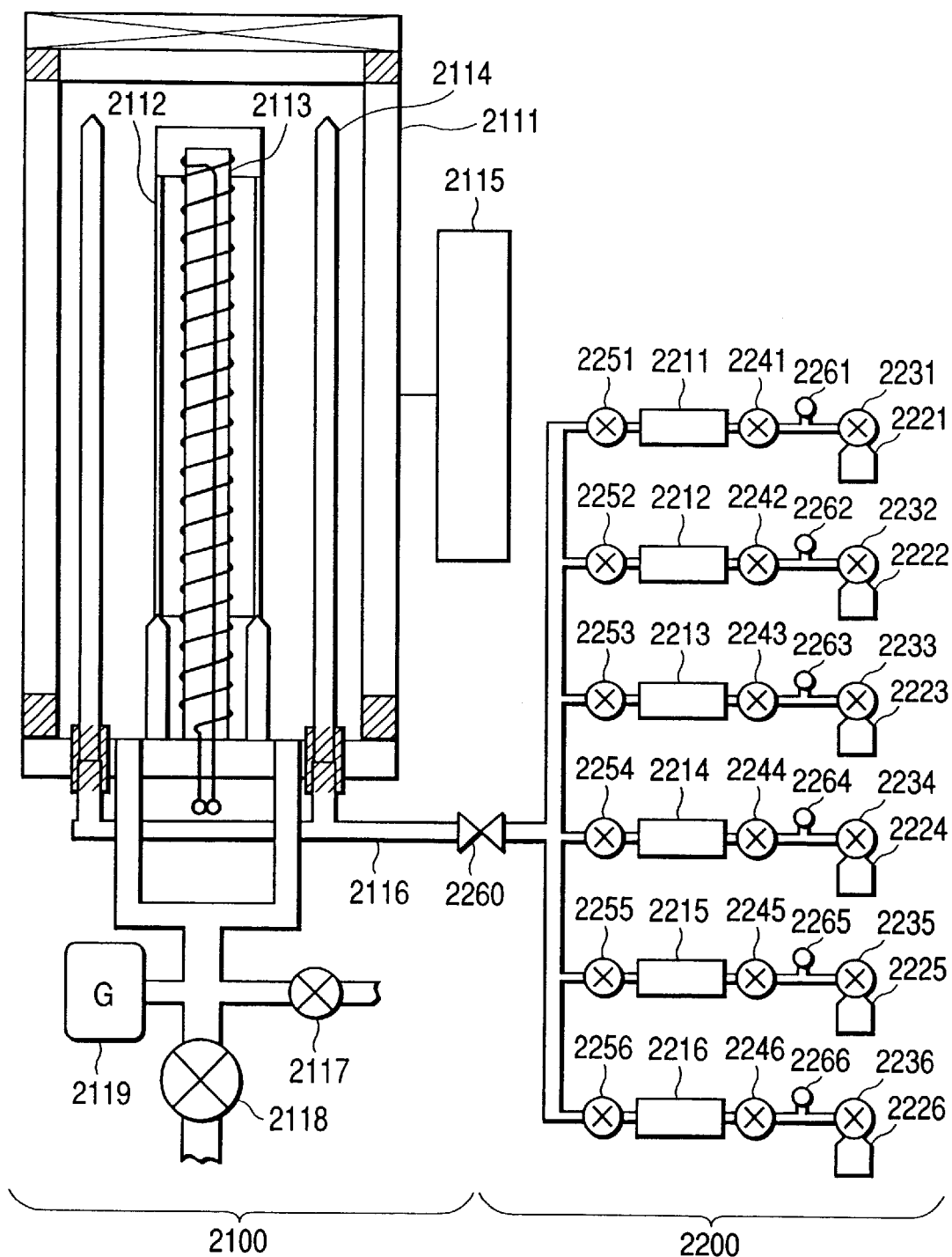
FIG. 9 is a schematic, explanatory diagram to show the schematic structure of one production apparatus for producing the photosensitive member for image forming apparatus by RF-PCVD.

An apparatus for forming the photosensitive layer and a film forming method will be described in detail. FIG. 9 is a schematic, structural diagram to show an example of the apparatus for producing the photosensitive member for image forming apparatus by the high-frequency plasma CVD method using the RF band as the power-supply frequency (hereinafter abbreviated as "RF-PCVD"). The structure of the production apparatus illustrated in FIG. 9 is as follows.

This apparatus is generally composed of a deposition device 2100, a source gas supply device 2200, and an exhaust system (not illustrated) for reducing the pressure inside a reaction vessel 2111. Inside the reaction vessel 2111 in the deposition device 2100 there are a cylindrical support 2112, a heater 2113 for heating the support, and source gas inlet pipes 2114, and a high-frequency matching box 2115 is connected thereto.

The source gas supply device 2200 has bombs 2221 to 2226 for supplying respective source gases of $SiH_4$, $GeH_4$, $H_2$, $CH_4$, $CH_4$, $B_2H_6$, $PH_3$, etc., valves 2231 to 2236, 2241 to 2246, 2251 to 2256, and mass flow controllers 2211 to 2216, and the bomb of each source gas is connected via a valve 2260 to the gas inlet pipes 2114 in the reaction vessel 2111.

Formation of the deposited film using this apparatus is carried out, for example, as described below.

First, the cylindrical support 2112 is set in the reaction vessel 2111 and the inside of the reaction vessel 2111 is evacuated by the unrepresented exhaust device (for example, a vacuum pump). Subsequently, the temperature of the cylindrical support 2112 is controlled to a predetermined temperature in the range of 200 to 350° C. by the heater 2113 for heating the support.

For letting the source gases for formation of the deposited film into the reaction vessel 2111, after confirming that the valves 2231 to 2236 of the gas bombs and a leak valve 2117 of the reaction vessel are closed and that the inflow valves 2241 to 2246, outflow valves 2251 to 2256, and auxiliary valve 2260 are opened, the main valve 2118 is first opened to evacuate the inside of the reaction vessel 2111 and gas pipe 2116.

When the reading of a vacuum gage 2119 reaches about $5 \times 10^{-6}$ Torr, the auxiliary valve 2260 and outflow valves 2251 to 2256 are closed.

Thereafter, the valve 2231 to 2236 is opened to introduce each gas from the corresponding gas bomb 2221 to 2226 and the pressure of each gas is adjusted to 2 kg/cm$^2$ by pressure regulator 2261 to 2266. Then the inflow valve 2241 to 2246 is gradually opened to introduce each gas into the mass flow controller 2211 to 2216.

After completion of the preparation for the film formation as described above, formation of each layer is carried out according to the following procedures. When the cylindrical support 2112 reaches the predetermined temperature, the necessary valves out of the outflow valves 2251 to 2256, and the auxiliary valve 2260 are gradually opened to introduce predetermined gases from the corresponding gas bombs 2221 to 2226 through the gas inlet pipes 2114 into the reaction vessel 2111.

Then each source gas is adjusted to a predetermined flow rate by the corresponding mass flow controller 2211 to 2216. On that occasion, the aperture of the main valve 2118 is adjusted with observing the vacuum gage 2119 so that the pressure inside the reaction vessel 2111 becomes the predetermined pressure of not more than 1 Torr. When the internal pressure becomes stable, the RF power supply (not illustrated) of the frequency 13.56 MHz is set to desired power and the RF power is supplied via the high-frequency matching box 2115 into the reaction vessel 2111, thereby inducing glow discharge.

The source gases introduced into the reaction vessel are decomposed by this discharge energy to form a predetermined deposited film having the matrix of silicon on the cylindrical support 2112. After the film is formed in a desired thickness, the supply of the RF power is stopped and the outflow valves are closed to stop the flow of the gases into the reaction vessel, thereby completing the formation of the deposited film.

The photosensitive layer is formed in the desired multilayer structure by repeating like operation plural times.

It is needless to mention that all the other outflow valves than those for necessary gases are closed on the occasion of formation of each layer. In addition, an operation for closing the outflow valves 2251 to 2256, opening the auxiliary valve 2260, and fully opening the main valve 2118 to evacuate the inside of the system once to a high vacuum is carried out as occasion may demand, in order to prevent the gases from remaining inside the reaction vessel 2111 and inside the pipe from the outflow valves 2251 to 2256 to the reaction vessel 2111.

For making the formation of film uniform, it is also effective to rotate the support 2112 at predetermined speed by a driving device (not illustrated) during the formation of the layer. Further, it is needless to mention that the gas species and valve operations described above are modified according to the production conditions of each layer.

Next described is a method for producing the photosensitive member for image forming apparatus by the high-frequency plasma CVD method using the frequency in the VHF band for the power supply (hereinafter referred to as "VHF-PCVD").

Figure 10:
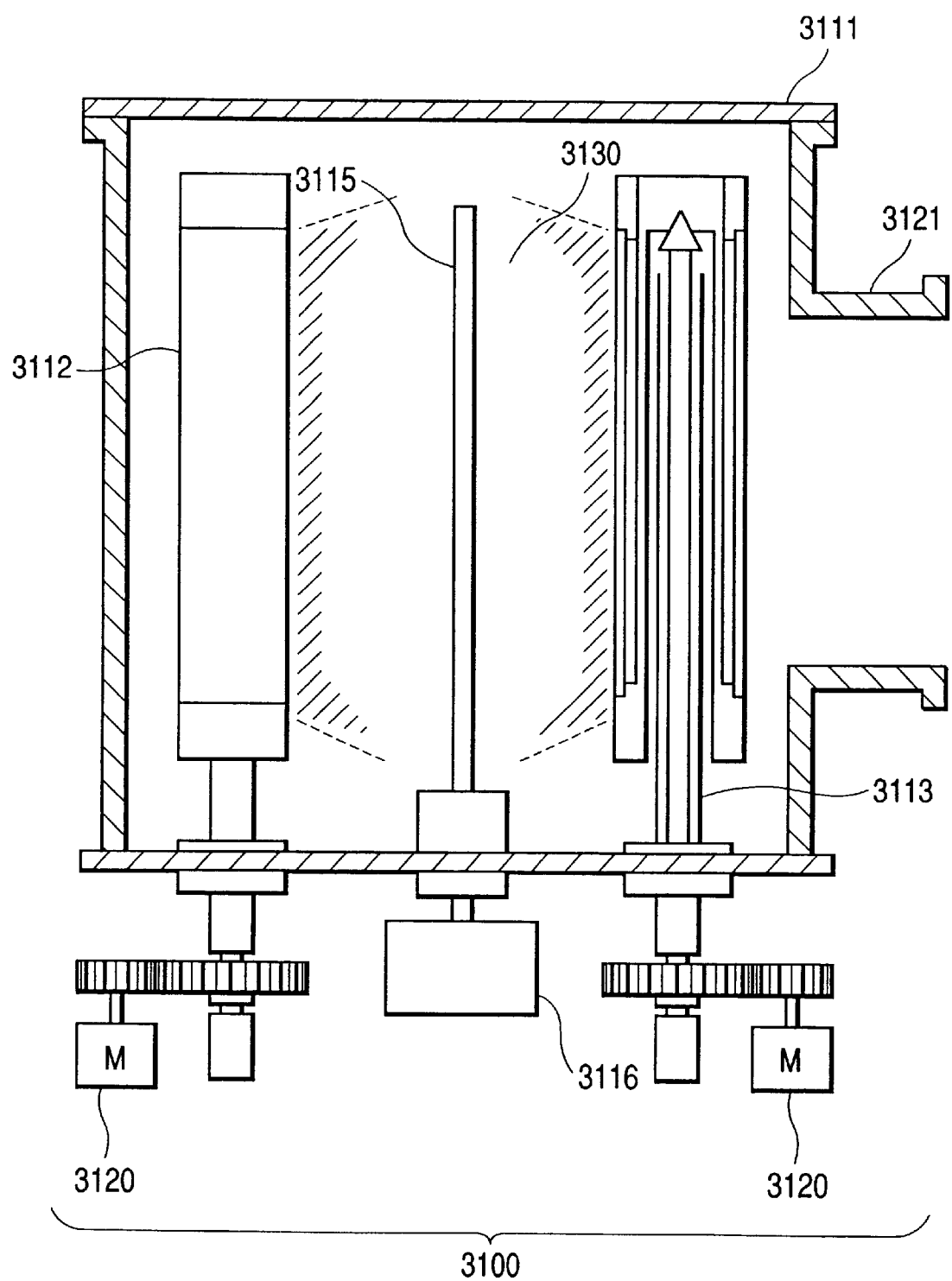
FIG. 10 is a schematic, explanatory diagram to show the schematic structure of a deposition apparatus.

An apparatus for producing the photosensitive member for image forming apparatus in the following structure can be obtained by replacing the deposition device 2100 by the RF-PCVD method in the production apparatus illustrated in FIG. 9 with the deposition device 3100 illustrated in FIG. 10 and connecting the deposition device 3100 to the source gas supply device 2200.

This apparatus is generally composed of the reaction vessel 3111 having a vacuum airtight structure and being capable of being depressurized, the source gas supply 2200, and the exhaust system (not illustrated) for reducing the pressure inside the reaction vessel. Inside this reaction vessel 3111 there are cylindrical supports 3112, heaters 3113 for heating the respective supports, source gas inlet pipe and electrode 3115, and a high-frequency matching box 3116 is connected to the electrode. Further, the inside of the reaction vessel 3111 is connected to a diffusion pump not illustrated via an exhaust pipe 3121.

The source gas supply device 2200 has the bombs 2221 to 2226 for supplying the respective source gases of SiH$_4$, GeH$_4$, H$_2$, CH$_4$, B$_2$H$_6$, PH$_3$, etc., the valves 2231 to 2236, 2241 to 2246, 2251 to 2256, and the mass flow controllers 2211 2216, and the bomb of each source gas is connected via the valve 2260 to the gas inlet pipe 3115 in the reaction vessel 3111. The discharge space is created as a space surrounded by the cylindrical supports 3112.

Formation of the deposited film using this apparatus by the VHF-PCVD method can be carried out as follows.

First, the cylindrical supports 3112 are set in the reaction vessel 3111 and the inside of the reaction vessel 3111 is evacuated by the unrepresented exhaust device (for example, a vacuum pump) to the pressure not more than $1 \times 10^{-7}$ Torr inside the reaction vessel 3111 while rotating the supports 3112 by driving devices 3120. Subsequently, the temperature of the cylindrical supports 3112 is controlled to the predetermined temperature of 200 to 350° C. by the support heating heaters 3113.

For letting the source gases for formation of the deposited film into the reaction vessel 3111, after confirming that the valves 2231 to 2236 of the gas bombs and the leak valve (not illustrated) of the reaction vessel are closed and that the inflow valves 2241 to 2246, outflow valves 2251 to 2256, and auxiliary valve 2260 are opened, the main valve (not illustrated) is first opened to evacuate the inside of the reaction vessel 3111 and gas pipe 3122.

When the reading of a vacuum gage (not illustrated) reaches about $5 \times 10^{-6}$ Torr, the auxiliary valve 2260 and outflow valves 2251 to 2256 are closed.

Thereafter, the valve 2231 to 2236 is opened to introduce each gas from the corresponding gas bomb 2221 to 2226 and the pressure of each gas is adjusted to 2 kg/cm$^2$ by the pressure regulator 2261 to 2266. Then the inflow valve 2241 to 2246 is gradually opened to introduce each gas into the mass flow controller 2211 to 2216.

After completion of the preparation for the film formation as described above, formation of each layer is carried out on the cylindrical supports 3112 according to the following procedures.

When the cylindrical supports 3112 reach the predetermined temperature, the necessary valves out of the outflow valves 2251 to 2256, and the auxiliary valve 2260 are gradually opened to introduce predetermined gases from the corresponding gas bombs 2221 to 2226 through the gas inlet pipe 3115 into the discharge space 3130 in the reaction vessel 3111. Then each source gas is adjusted to a predetermined flow rate by the corresponding mass flow controller 2211 to 2216. On that occasion, the aperture of the main valve (not illustrated) is adjusted with observing the vacuum gage (not illustrated) so that the pressure inside the discharge space 3130 becomes the predetermined pressure of not more than 1 Torr.

When the pressure becomes stable, the VHF power supply (not illustrated) of the frequency 500 MHz is set to desired power and the VHF power is supplied via the matching box 3116 into the discharge space 3130, thereby inducing the glow discharge.

In the discharge space 3130 surrounded by the supports 3112, the source gases introduced thereinto are excited and dissociated by the discharge energy, forming the predetermined deposited film on the cylindrical supports 3112. At this time, the supports are rotated at desired rotation speed by the support rotating motors 3120 in order to make the formation of the layer uniform.

After the film is formed in a desired thickness, the supply of the VHF power is stopped and the outflow valves are closed to stop the flow of the gases into the reaction vessel, thereby completing the formation of the deposited film.

The photosensitive layer is formed in the desired multilayer structure by repeating like operation plural times.

It is needless to mention that all the other outflow valves than those for necessary gases are closed on the occasion of formation of each layer. In addition, an operation for closing the outflow valves 2251 to 2256, opening the auxiliary valve 2260, and fully opening the main valve (not illustrated) to evacuate the inside of the system once to a high vacuum is carried out as occasion may demand, in order to prevent the gases from remaining inside the reaction vessel 3111 and inside the pipe from the outflow valves 2251 to 2256 to the reaction vessel 3111.

It is needless to mention that the gas species and valve operations described above are modified according to the production conditions of each layer.

In either method, the support temperature during the formation of deposited film is particularly in the range of not less than 200° C. nor more than 350° C., preferably in the range of not less than 230° C. nor more than 330° C., and more preferably in the range of not less than 250° C. nor more than 300° C.

The method for heating the support can be carried out any heater of vacuum specifications, and specific examples are a wrapping heater of a sheath heater, a sheetlike heater, an electric resistance heater such as a ceramic heater, a heat radiant lamp heater such as a halogen lamp, an infrared lamp, or the like, a heater by use of heat exchange means using a liquid, a gas, or the like as a heat medium, and so on. The surface material of the heating means can be selected from metals such as stainless steel, nickel, aluminum, copper, and so on, ceramics, heat-resistant polymers, and so on.

Another method is to provide a heating-dedicated container except for the reaction vessel and transport the support after heated therein, into the reaction vessel in vacuum or the like.

Particularly, in the VHF-PCVD method, the pressure of the discharge space is desirably to be set preferably in the range of not less than 1 mTorr to not more than 500 mTorr, more preferably in the range of not less than 3 mTorr to not more than 300 mTorr, and most preferably in the range of not less than 6 mTorr to not more than 100 mTorr.

In the VHF-PCVD method, the size and shape of the electrode provided in the discharge space can be arbitrary as long as the discharge is not disordered. The electrode is preferably formed in a cylindrical shape having the diameter not less than 1 mm nor more than 10 cm in practice. At this time, the length of the electrode can also be set arbitrarily as long as it is the length to allow uniform application of an electric field to the support.

The material for the electrode can be any material the surface of which is electrically conductive. For example, the electrode is normally made of one selected from metals such as stainless steel, Al, Cr, Mo, Au, In, Nb, Te, V, Ti, Pt, Pb, Fe, and so on, alloys of such metals, glasses, ceramics, and plastics whose surface is subjected to an electric conduction treatment, and so on.

The means and action described above can be employed singly or in combination, whereby the excellent effect can be presented.

Figure 13:
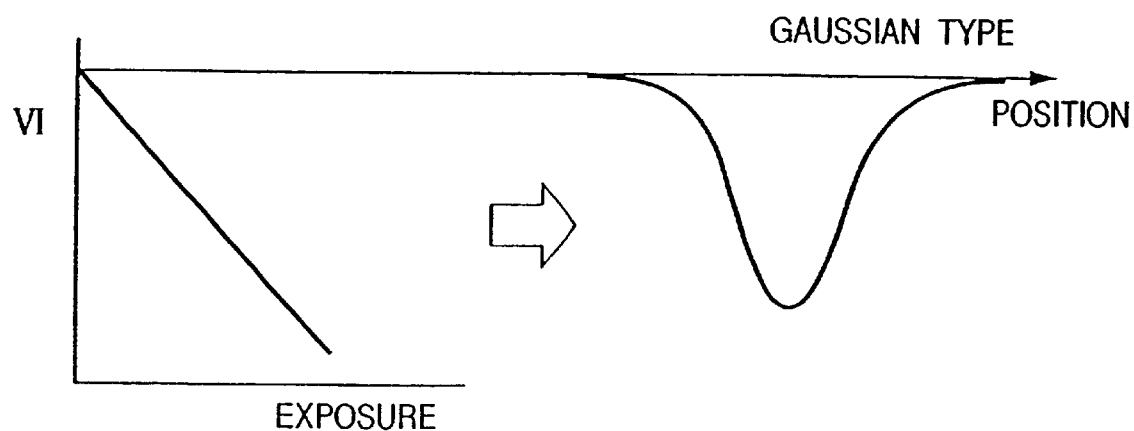
FIG. 13 is a graph to show photosensitivity characteristics of the a-Si photosensitive member.

In the case of the amorphous silicon photosensitive members, the sensitivity thereof normally has no electric field dependence from the principle of carrier conduction and the EV characteristics have the linear shape as illustrated in FIG. 13; therefore, there is no light amount at which a light amount change is apt to be reflected by the potential.

Therefore, the potential distribution is also the Gaussian distribution against the light amount distribution of the Gaussian distribution; there is thus such an advantage that the degree of influence on the change of dot diameter is relatively small and the image quality is unlikely to be affected even if the light amounts vary at the base of the light amount distribution.

Since the wear factor in long-term use is not crucial, the sensitivity or the EV characteristic varies less in long-term use, so that the problem due to the wear as in OPC is not posed.

The present invention will be described in further detail by the following examples, but it is noted that the present invention is by no means intended to be limited to these examples.

TEST EXAMPLE 1

Figure 1:
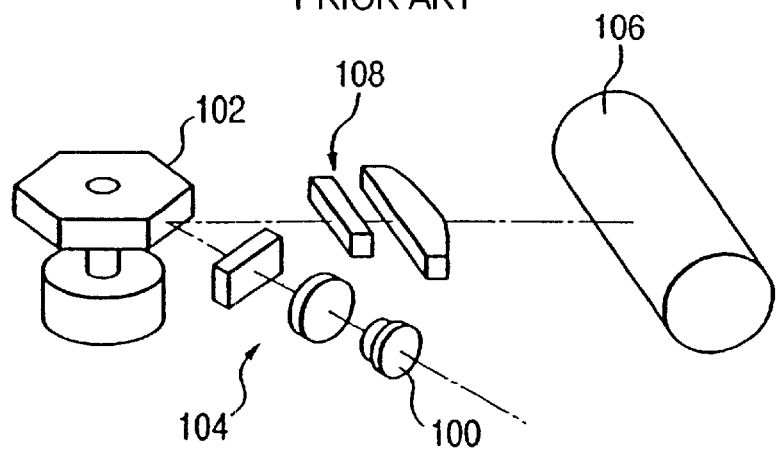
FIG. 1 is a schematic diagram to show the schematic structure of the optical scanning device.
Figure 2:
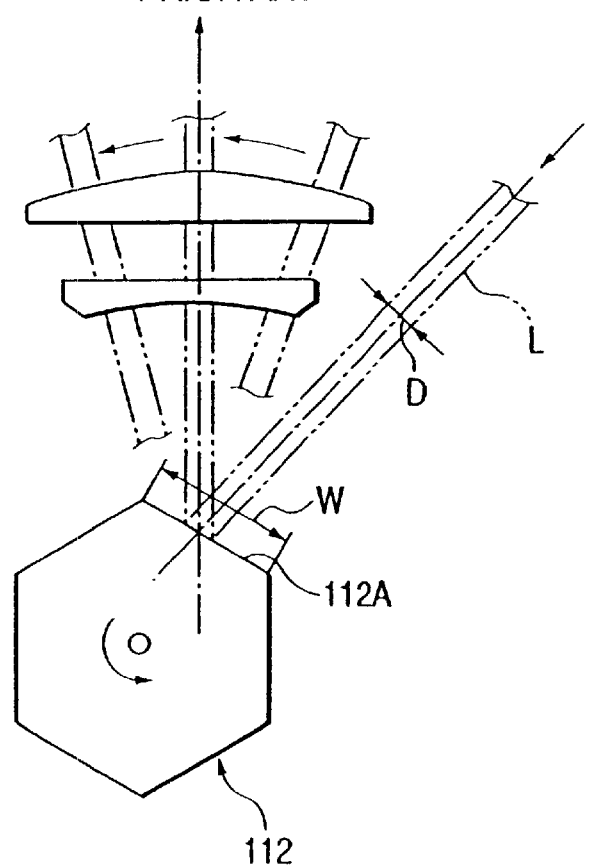
FIG. 2 is a schematic diagram to show the schematic structure of the underfield type optical system UFS and an example of the rotary polygon mirror.
Figure 11:
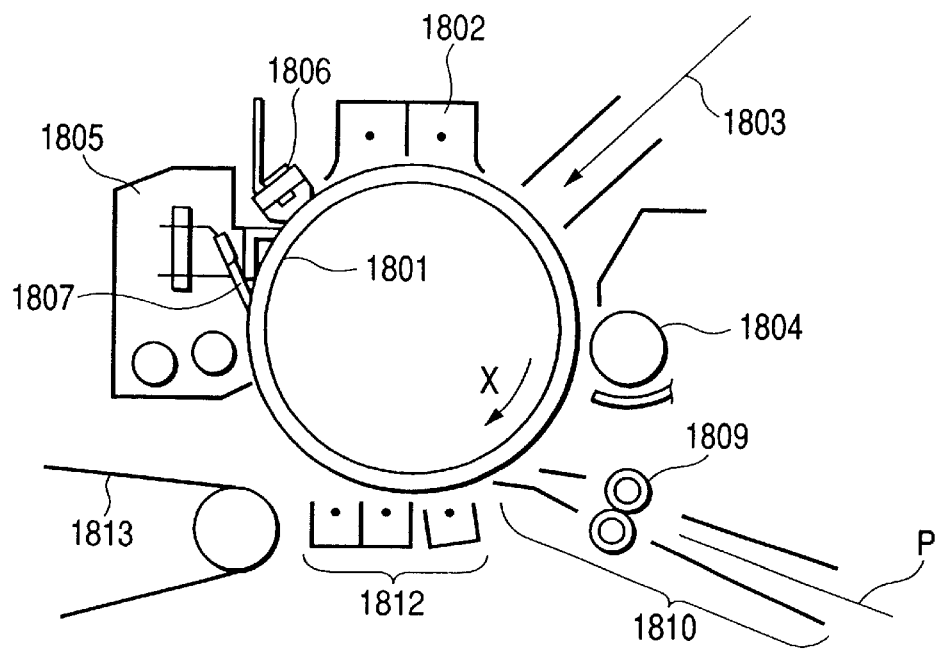
FIG. 11 is a schematic, explanatory diagram to show the image forming process of the electrophotographic apparatus.

Tests were conducted using the electrophotographic apparatus equipped with the optical scanning device as illustrated in FIG. 1 described previously, and the means for charging, exposure, development, sheet conveyance, etc., as illustrated in FIG. 11, around the recording medium 106.

The optical scanning device of FIG. 1 is composed of the laser diode 100, the rotary polygon mirror 102, the light-source optical system 104 for guiding the laser beam emitted from the laser diode 100 to the rotary polygon mirror 102, and the scanning optical system 108 for guiding the laser beam deflected by the rotary polygon mirror 102 to the recording medium 106 to scan it.

FIG. 11 is a schematic diagram to show the image forming process of the electrophotographic apparatus, in which around a rotary, cylindrical, photosensitive member 1801 extending along the normal direction to the plane of the drawing and arranged to rotate in the direction of X there are provided a primary charger 1802 in proximity of the photosensitive member, an image forming beam 1803, a developing unit 1804, a transfer sheet feeding system 1810, a transfer-separation charger 1812, a cleaning unit 1805, a main charge elimination light source 1806, a conveying system 1813, and so on.

The photosensitive member 1801 is uniformly charged by the primary charger 1802 and is then exposed to the image forming beam 1803 carrying information of an original, thereby forming an electrostatic, latent image on the photosensitive member 1801.

The latent image is subject to a supply of toner from the developing unit 1804 to form a visible image or toner image.

On the other hand, a transfer medium P is fed through the transfer sheet feeding system 1810 comprised of a transfer sheet path 1811 and registration rollers 1809, toward the photosensitive member 1801 and is given an electric field of the opposite polarity to that of the toner from the back in the gap between the transfer charger 1812 and the photosensitive member 1801, whereby the toner image on the surface of the photosensitive member is transferred onto the transfer medium P.

The transfer medium P after being separated is guided through the transfer sheet conveying system 1813 to a fixing device (not illustrated) and is then discharged out of the apparatus.

The residual toner remaining on the surface of the photosensitive member without contributing to the transfer at the transfer section is cleaned off by a cleaning blade 1807 at the cleaner 1805 and the photosensitive member 1801 renewed by cleaning is then exposed to charge elimination light from the main charge elimination light source 1806 to be brought again into the next image forming process.

Figure 12:
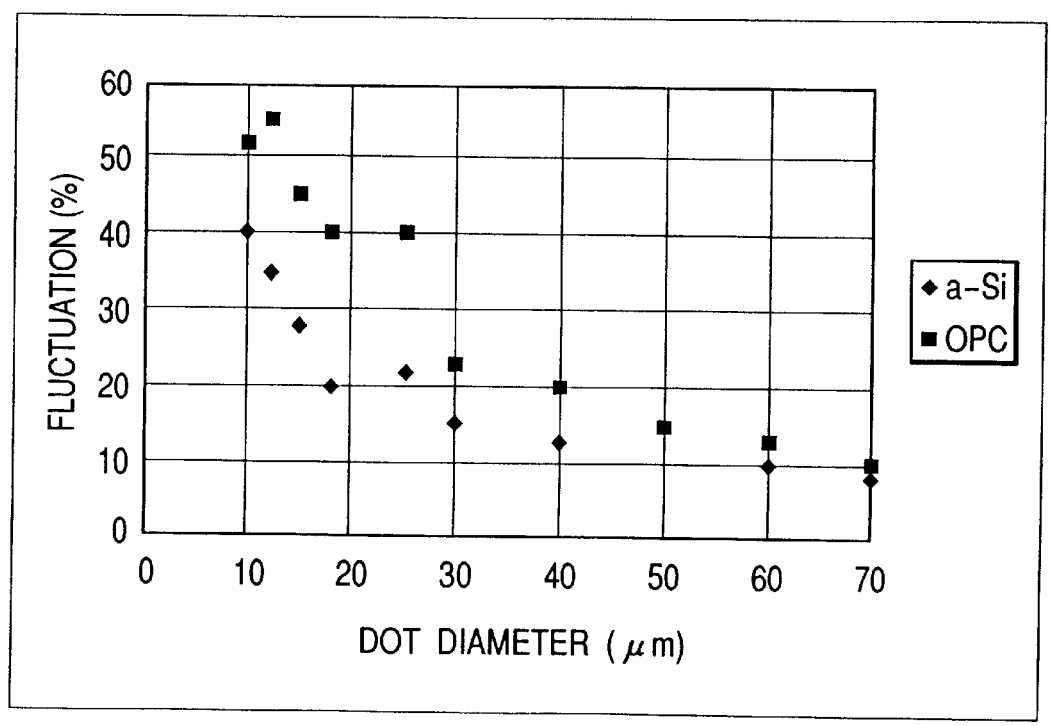
FIG. 12 is a graph to show an example of results of measurement where dot fluctuations were measured with variations in dot area.
Figure 14:
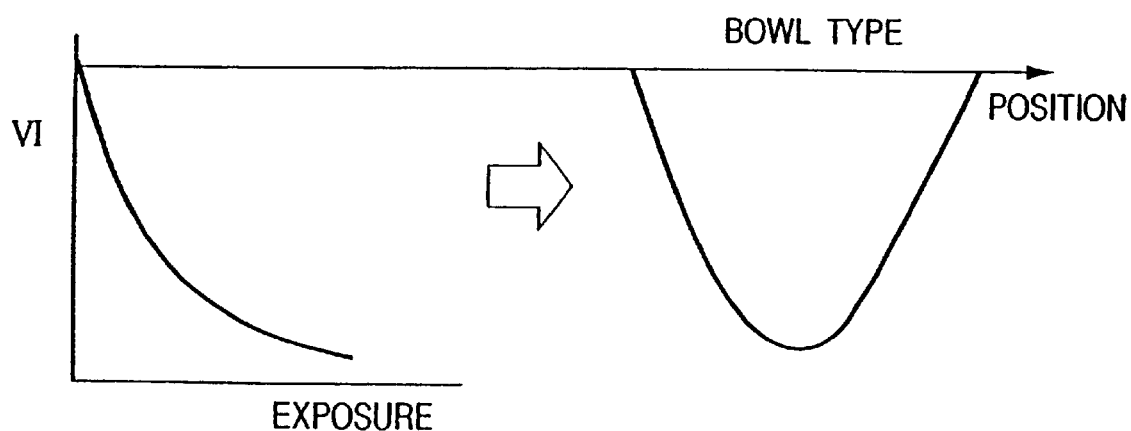
FIG. 14 is a graph to show the photosensitivity characteristics of the OPC photosensitive member.

With the apparatus described above, dot images each pixel of which was composed of one dot were formed by IAE. A dot fluctuation was defined as a standard deviation of a dot area from an average area of dots. Dot fluctuations were measured with variations of dot areas. The results of the measurement are shown in FIG. 12. It is seen from FIG. 12 that the degree of degradation of dot fluctuations with decreasing dot diameter x is better in the use of the a-Si photosensitive member having the photosensitive characteristics as illustrated in FIG. 13 than in the use of the OPC photosensitive member having the photosensitive characteristics as illustrated in FIG. 14.

TEST EXAMPLE 2

Figure 3:
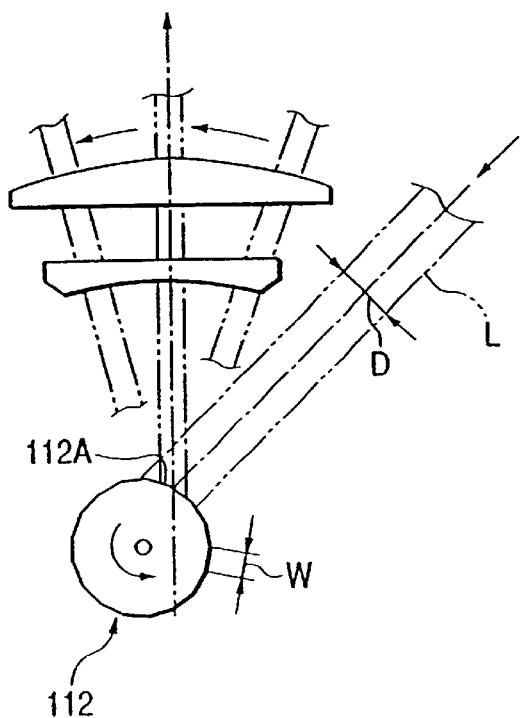
FIG. 3 is a schematic diagram to show the schematic structure of the overfield type optical system OFS and an example of the rotary polygon mirror.
Figure 15:
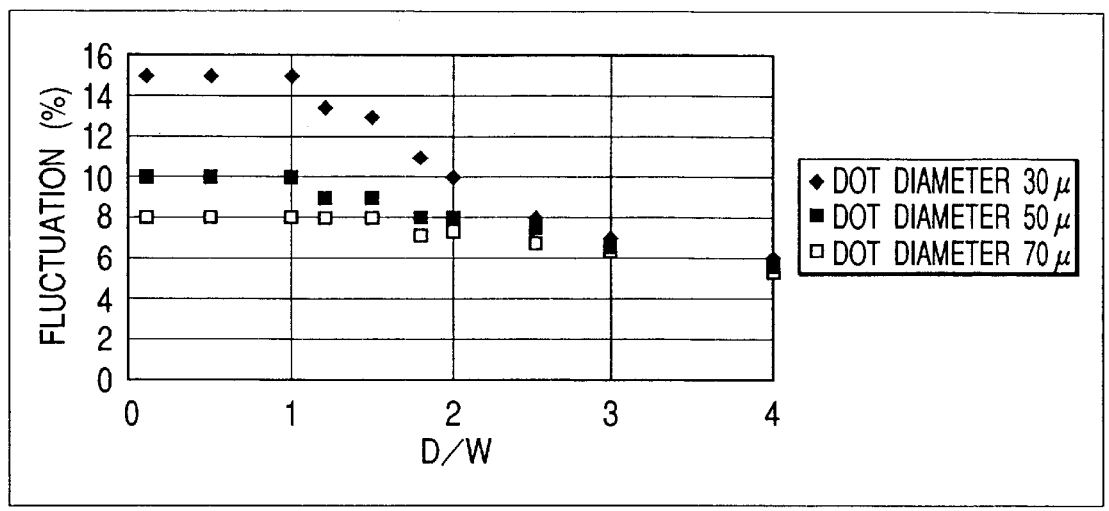
FIG. 15 is a graph to show an example of results of measurement where dot fluctuations were measured with variations in the relation between the light beam diameter and the width in the main scanning direction of the opposed surface of the rotary polygon mirror.

Using the a-Si photosensitive member in the apparatus similar to that in Test Example 1 except that the optical scanning device was the one as illustrated in FIG. 3 described previously, the dot fluctuations were measured in IAE with variations in the relation between the light beam diameter D at the reflecting surface of the rotary polygon mirror and the width W in the main scanning direction of one deflecting surface of the rotary polygon mirror, and the results of the measurement are shown in FIG. 15.

It is seen from FIG. 15 that the dot fluctuations decrease with increasing D/W, that the effect becomes prominent with smaller dot diameter x, and that the effect appears at and below 60 μm.

TEST EXAMPLE 3

Figure 16:
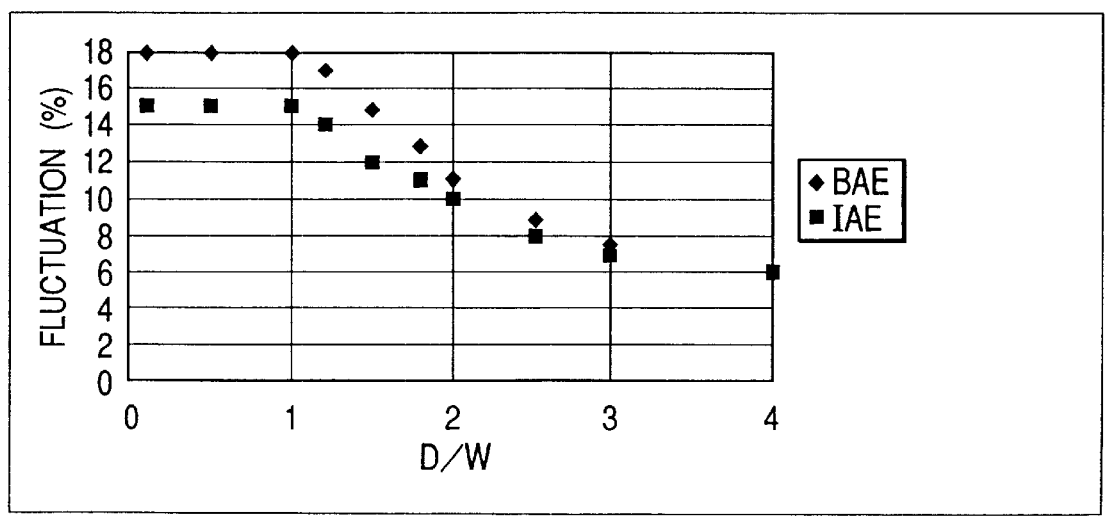
FIG. 16 is a graph to show an example of results of comparison between the image forming methods (IAE, BAE) at the dot diameter of 30 $\mu$m.

Like tests were conducted at the dot diameter 30 μm and in the image forming methods of BAE and IAE, using the a-Si photosensitive member in the apparatus similar to that in Test Example 2, and the results of comparison between the image forming methods are shown in FIG. 16. It is seen from FIG. 16 that the effect of decreasing the dot fluctuations becomes more prominent with increasing D/W in BAE than in IAE.

TEST EXAMPLE 4

Flare was defined as a ratio of stray light such as reflected light or the like from adjacent facets of the rotary polygon mirror to the real beam light. Using the a-Si photosensitive member in the apparatus similar to that in Test Example 2, the flare was measured with variations in the relation of D to W in the optical systems of the type of FIG. 3 and the type of FIG. 4, and the results of the measurement are shown in FIG. 17.

Figure 4:
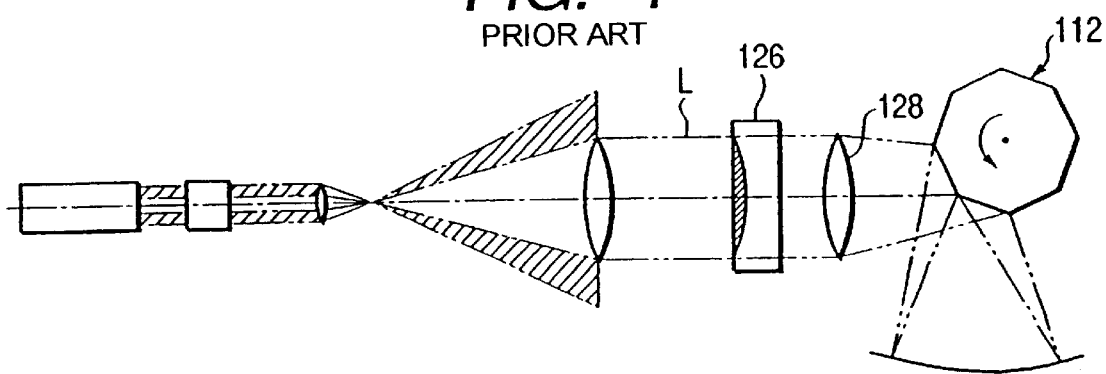
FIG. 4 is a schematic diagram to show the schematic structure of a light amount distribution shaping optical system with a transmission-distributed filter and an example of the rotary polygon mirror.
Figure 5:
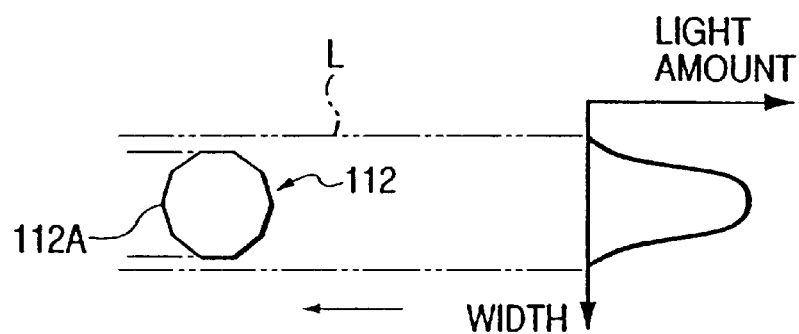
FIG. 5 is a schematic diagram to show the schematic structure of an optical system with less unevenness of the light beam reflected by one reflecting surface of the rotary polygon mirror by widening the width of the light beam incident to the rotary polygon mirror by the light-source optical system, and an example of the rotary polygon mirror.
Figure 6:
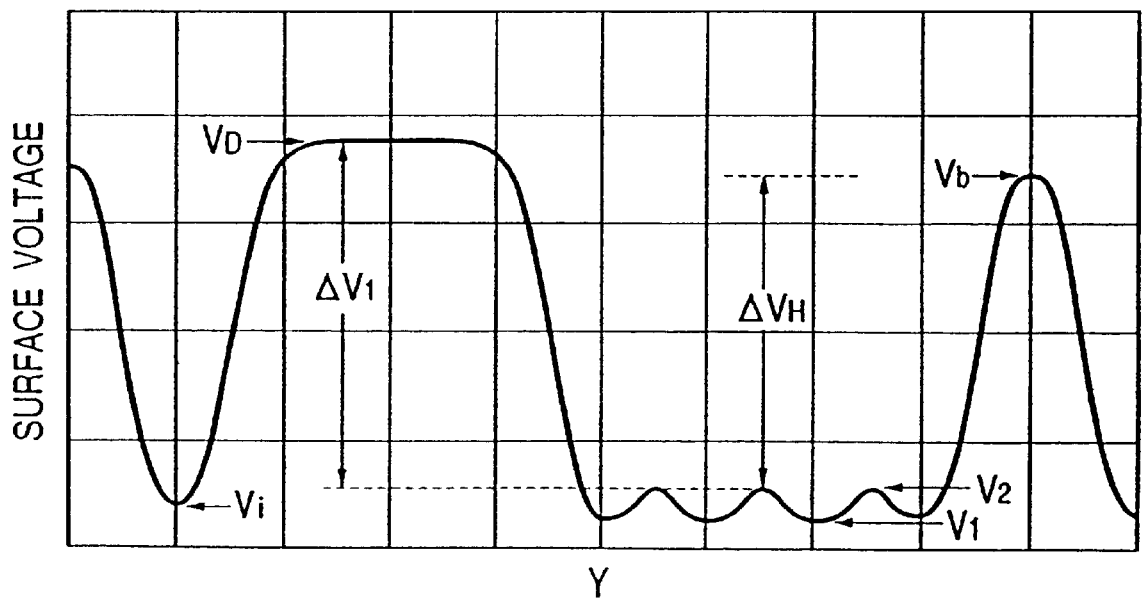
FIG. 6 is a graph to show an example of latitudes of IAE and BAE.
Figure 7:
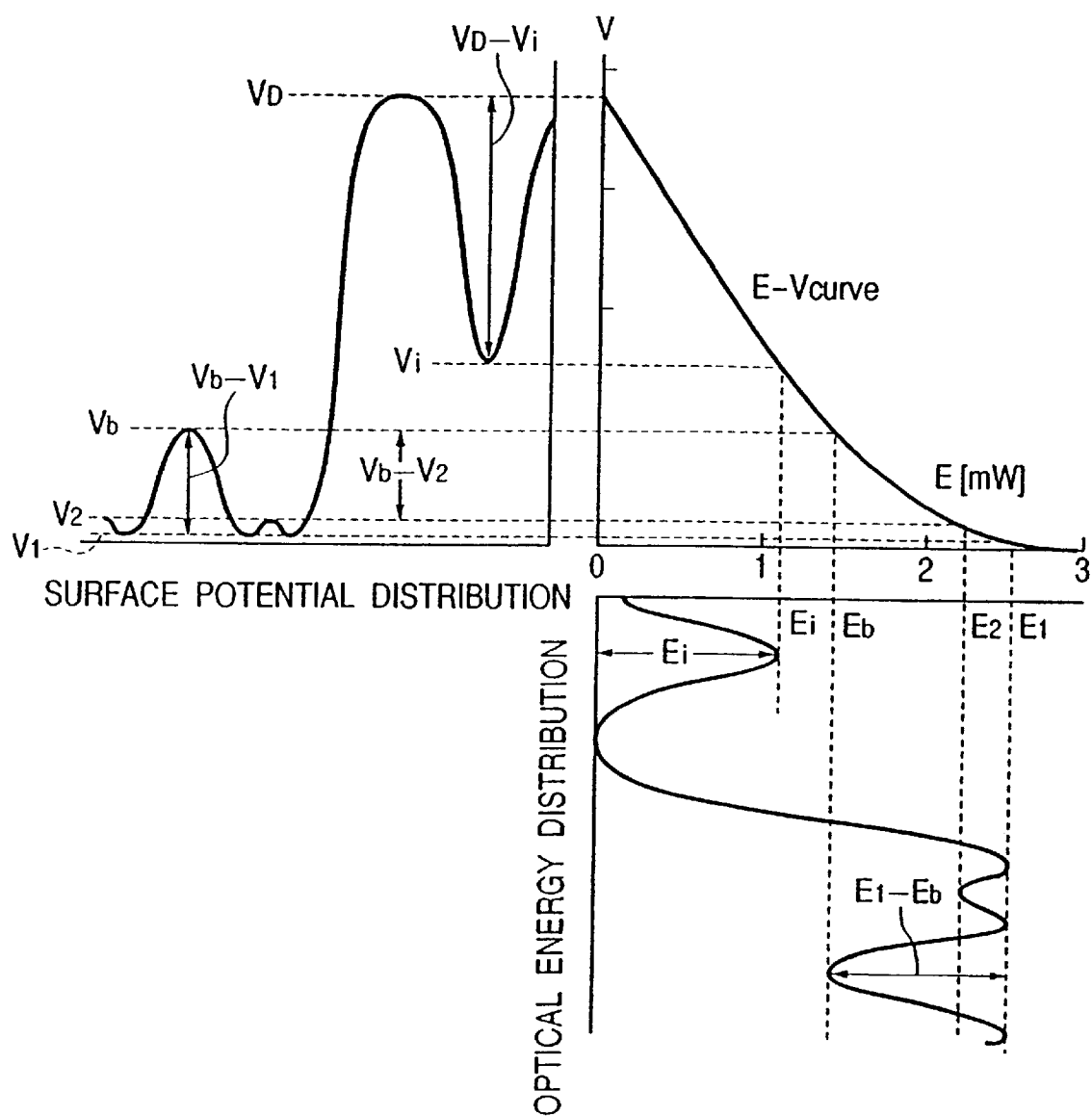
FIG. 7 is a graph to show the relationship among exposure distribution, EV characteristics of the photosensitive member, and potential distribution.
Figure 17:
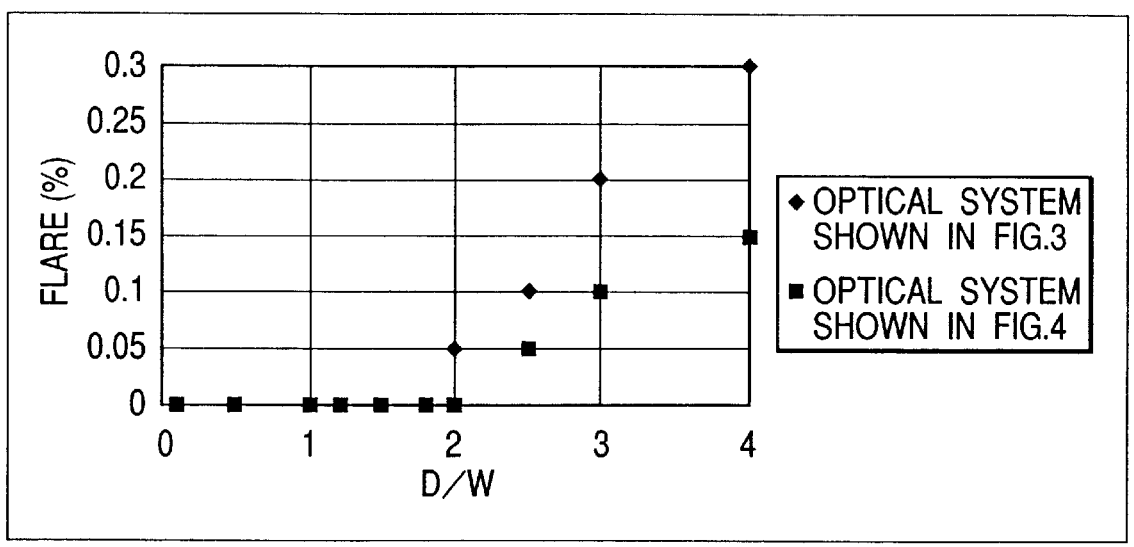
FIG. 17 is a graph to show an example of results of measurement of flare with variations in the relation of D to W, in the overfield type optical system (FIG. 3) and in the filter-provided light amount distribution shaping optical system (FIG. 4)

It is seen from FIG. 17 that the flare tends to become worse with increasing D/W and that the flare is less likely to appear in the type of FIG. 4 than in the type of FIG. 3.

TEST EXAMPLE 5

Figure 18A:
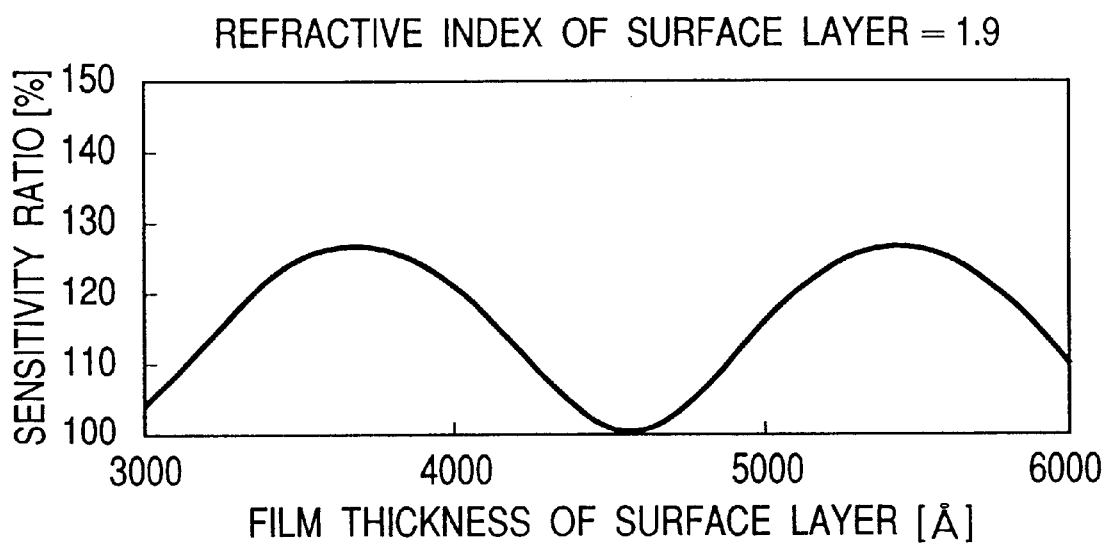
FIGS. 18A and 18B are graphs to show examples of results of measurement where sensitivities were measured with variations in the film thickness and film quality of the surface layer of the a-Si photosensitive member.
Figure 18B:
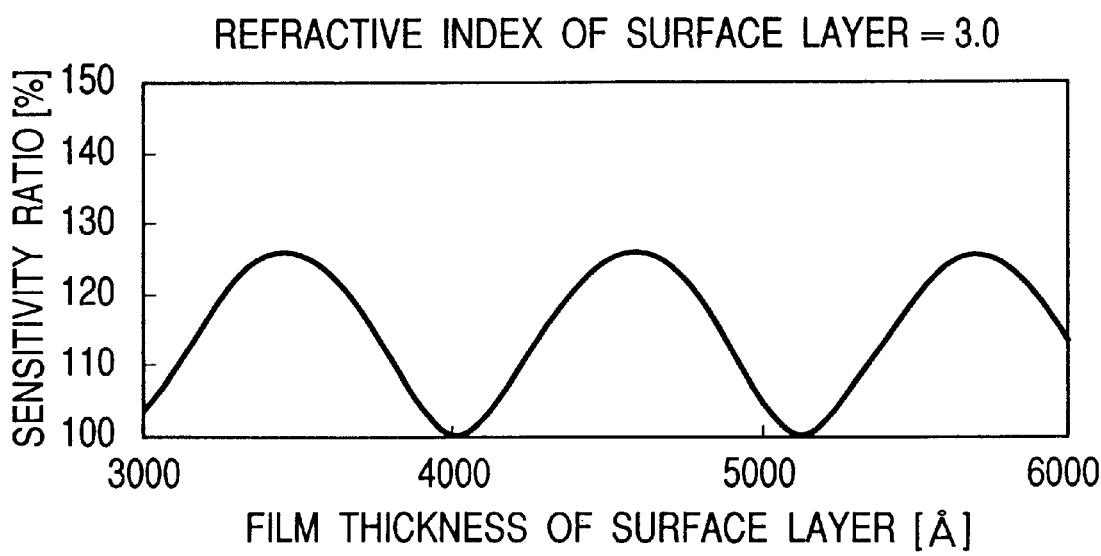

Sensitivity was defined as an exposure amount necessary for attenuation of potential from the dark potential of the photosensitive member to a fixed potential. The sensitivity was measured with variations in the film thickness and film quality of the surface laser of the a-Si photosensitive member, and the results of the measurement are shown in FIGS. 18A and 18B. It is seen from FIGS. 18A and 18B that the sensitivity tends to vary with variations in the refractive index and the film thickness.

EXAMPLE 1

The analog CANON copier NP6750 having the structure as illustrated in FIG. 11 was modified into a digital machine provided with the optical scanning device as illustrated in FIG. 1, which was used in the present example.

The type of the optical system was the one illustrated in FIG. 3, the image forming method was IAE, the photosensitive member was the a-Si base photosensitive member, and the field angle control by the surface layer was not made.

The dot diameter was 30 μm on the surface of the photosensitive member and D/W was 2.0 on the surface of the rotary polygon mirror. Under the above circumstances, the system was evaluated as to dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of the present example was rated totally good.

EXAMPLE 2

The evaluation was carried out using the apparatus similar to that in Example 1 except that the type of the optical system was the one illustrated in FIG. 4. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of the present example was rated totally good.

EXAMPLE 3

The evaluation was carried out using the apparatus similar to that in Example 2 except that the image forming method was BAE. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of the present example was rated totally very good.

EXAMPLE 4

The evaluation was carried out using the apparatus similar to that in Example 3 except that the film quality and film thickness of the surface layer were controlled in the axial direction of the cylinder of the a-Si base photosensitive member to adjust the potential unevenness due to the field angle characteristics. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of the present example was rated totally very good.

COMPARATIVE EXAMPLE 1

The evaluation was carried out using the apparatus similar to that in Example 3 except that the photosensitive member was the OPC photosensitive member. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of this comparative example was rated totally practically nonproblematic.

COMPARATIVE EXAMPLE 2

The evaluation was carried out using the apparatus similar to that in Example 4 except that D/W was 1.0. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of this comparative example was rated totally practically nonproblematic.

COMPARATIVE EXAMPLE 3

The evaluation was carried out using the apparatus similar to that in Example 4 except that the dot diameter was 70 μm on the surface of the photosensitive member. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of this comparative example was rated totally practically nonproblematic.

COMPARATIVE EXAMPLE 4

The evaluation was carried out using the apparatus similar to that in Example 4 except that D/W was 4.0 on the surface of the rotary polygon mirror. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of this comparative example was rated totally practically nonproblematic.

COMPARATIVE EXAMPLE 5

The evaluation was carried out using the apparatus similar to that in Comparative Example 4 except that the type of the optical system was the one illustrated in FIG. 3. Under the above circumstances, the system was evaluated as to the dot stability, flare, potential unevenness in the axial direction of the cylinder of the photosensitive member, design latitude, and image quality resolution, based on the following criteria for judgment; "⊚" very good, "○" good, "Δ" practically nonproblematic, and "×" practically problematic. The results of the evaluation are shown in Table 1.

As apparent from the table, the system of this comparative example was rated totally practically problematic.

TABLE 1

| | D/W | Dot diameter X | Image forming method | Type of optical system | Drum | Field angle cont by surface layer | Dot stability | Flare | Unevenness | Design latitude | Image quality resolution | Total rank |
|---|---|---|---|---|---|---|---|---|---|---|---|---|
| Ex 1 | 2 | 30 | IAE | FIG. 3 | a-Si | no | ⊚ | ○ | ○ | ○ | ⊚ | ○ |
| Ex 2 | 2 | 30 | IAE | FIG. 4 | a-Si | no | ⊚ | ⊚ | ○ | ○ | ⊚ | ○ |
| Ex 3 | 2 | 30 | BAE | FIG. 4 | a-Si | no | ⊚ | ⊚ | ○ | ⊚ | ⊚ | ⊚ |
| Ex 4 | 2 | 30 | BAE | FIG. 4 | a-Si | yes | ⊚ | ⊚ | ⊚ | ⊚ | ⊚ | ⊚ |
| Comp. Ex 1 | 2 | 30 | BAE | FIG. 4 | OPC | no | Δ | ⊚ | ○ | ⊚ | ○ | Δ |
| Comp. Ex 2 | 1 | 30 | BAE | FIG. 4 | a-Si | yes | Δ | ⊚ | ⊚ | ⊚ | ⊚ | Δ |
| Comp. Ex 3 | 2 | 70 | BAE | FIG. 4 | a-Si | yes | ⊚ | ⊚ | ⊚ | ⊚ | Δ | Δ |
| Comp. Ex 4 | 4 | 30 | BAE | FIG. 4 | a-Si | yes | ⊚ | Δ | ⊚ | ⊚ | ⊚ | Δ |
| Comp. Ex 5 | 4 | 30 | BAE | FIG. 3 | a-Si | yes | ⊚ | × | ⊚ | ⊚ | ⊚ | × |

As described above, the present invention provides the electrophotographic apparatus equipped with the optical scanning device for guiding the light beam to the rotary polygon mirror and deflecting it thereby, which is characterized by using the a-Si base photosensitive member and satisfying the relation of $3.0 \geq D/W \geq 1.5$ between the light beam diameter D at the reflecting surface of the rotary polygon mirror and the width W in the main scanning direction of one deflecting surface of the rotary polygon mirror and which has such structure as to use only the relatively stable light amount range near the center of the spot light amount distribution, whereby the apparatus demonstrates the excellent effects of the less influence on the potential fluctuations (fluctuations of dot diameter) from light amount variations at the base of the light amount distribution and the capability of forming the stable dot latent image.

The use of OFS permits a compact rotary polygon mirror. This permits higher-speed operation and achieves very good matching with highly durable a-Si accordingly. Therefore, the present invention can provide the electrophotographic apparatus capable of implementing prints of high quality at high speed and with high durability.

Further, because in BAE the influence of instability of dot latent image on the image quality becomes more prominent, the effect of the present invention can be more outstanding in BAE.

On the other hand, because angles of the light beam incident to the surface of the photosensitive member vary for the reason of the principle of scanning with the light beam by the rotary polygon mirror, the light amount distribution (field angle characteristics) appears in the axial direction on the surface of the photosensitive member. The present invention involves the use of the a-Si photosensitive member having the coherence surface layer to change amounts of incident light by interference, whereby the invention presents the extremely outstanding effect including the capability of controlling the field angle characteristics by the film thickness and film quality.

What is claimed is:

1. An electrophotographic apparatus comprising:
   a light scanning device for guiding a light bean onto a reflecting surface of a rotary polygon mirror and deflecting the light beam; and
   a recording medium, which the light beam deflected by said light scanning device scans to form an image, said recording medium comprising an a-Si base photosensitive member, said a-Si base photosensitive member including a surface layer having a film thickness varying in a main scanning direction, and further having a refractive index varying in the main scanning direction due to a variance in film quality depending on an angle of the light beam incident to said surface layer and having a liner photosensitivity (EV) characteristic,
   wherein the following inequality satisfied:

$$3.0 \geq D/W \geq 1.5,$$

where D is a diameter of the light beam at said reflecting surface of said rotary polygon mirror, and W is a width in the main scanning direction of said reflecting surface of said rotary polygon mirror.

2. The electrophotographic apparatus according to claim 1, wherein the film thickness and the refractive index of said surface layer of said photosensitive member change monotonically from the center toward the ends in the main scanning direction.

3. An electrophotographic method comprising:
   a step of guiding a light beam onto a reflecting surface of a rotary polygon mirror and deflecting the light beam so as to satisfy the following inequality:

$$3.0 \geq D/W \geq 1.5,$$

where D is a diameter of the light beam at the reflecting surface of the rotary polygon mirror, and W is a width in a main scanning direction of the reflecting surface of the rotary polygon mirror; and
   a step of forming an image with the light beam on a recording medium comprising an a-Si base photosensitive member, the a-Si base photosensitive member including a surface layer having a film thickness varying in the main scanning direction, and having a refractive index varying in the main scanning direction due to a variance in film quality depending on an angle of the light beam incident to the surface layer and having a linear photosensitivity (EV) characteristic.

4. The electrophotographic method according to claim 3, wherein the film thickness and the refractive index of the surface layer of the photosensitive member change monotonically from the center toward the ends in the main scanning direction.

5. An electrophotographic apparatus comprising:
   a light scanning device for guiding a light beam onto a reflecting surface of a rotary polygon mirror and deflecting the light beam; and
   a recording medium, which the light beam deflected by said light scanning device scans to form an image, said recording medium comprising an a-Si base photosensitive member, said a-Si base photosensitive member including a surface layer having a film thickness varying in a main scanning direction depending on an angle of the light beam incident to said surface layer, and further having a linear photosensitivity (EV) characteristic,
   wherein the following inequality is satisfied:

$$3.0 \geq D/W \geq 1.5,$$

where D is a diameter of the light beam at the reflecting surface of said rotary polygon mirror, and W is a width in a main scanning direction of said reflecting surface of said rotary polygon mirror.

6. The electrophotographic apparatus according to claim 1 or 5, wherein the light beam is a laser light beam and a diameter of a spot thereof is not more than 60 μm on said surface layer of said photosensitive member.

7. The electrophotographic apparatus according to claim 1 or 5, wherein a method for forming the image on said photosensitive member is a background exposure method for exposing nonimage areas (background areas) to the light beam.

8. The electrophotographic apparatus according to claim 1 or 5, wherein said surface layer of said photosensitive member is coherent.

9. The electrophotographic apparatus according to claim 5, wherein the film thickness of said surface layer of said photosensitive member changes momentarily monotonically from the center toward the ends in the main scanning direction.

10. An electrophotographic method comprising:
    a step of guiding a light beam onto a reflecting surface of a rotary polygon mirror and deflecting the light beam so as to satisfy the following inequality:

$$3.0 \geq D/W \geq 1.5,$$

where D is a diameter of the light beam at the reflecting surface of the rotary polygon mirror, and W is a width in a main scanning direction of the reflecting surface of the rotary polygon mirror; and a step of forming an image with the light beam on a recording medium comprising an a-Si base photosensitive member, the a-Si base photosensitive member including a surface layer having a film thickness varying in the main scanning direction depending on an angle of the light beam incident to the surface layer, and having a linear photosensitivity (EV) characteristic.

11. The electrophotographic method according to claim 3 or 10, wherein the light beam is laser light beam and a diameter of a spot thereof is not more than 60 μm on the surface layer of the photosensitive member.

12. The electrophotographic method according to claim 3 or 10, wherein the step of forming the image on the photosensitive member comprises a background exposure step for exposing nonimage areas (background areas) to the light beam.

13. The electrophotographic method according to claim 3 or 10, wherein the surface layer of the photosensitive member is coherent.

14. The electrophotographic method according to claim 10, wherein the film thickness of the surface layer of the photosensitive member changes monotonically from the center toward the ends in the main scanning direction.

* * * * *

UNITED STATES PATENT AND TRADEMARK OFFICE
CERTIFICATE OF CORRECTION

PATENT NO.    : 6,556,233 B2
DATED         : April 29, 2003
INVENTOR(S)   : Toshiyuki Ehara et al.

It is certified that error appears in the above-identified patent and that said Letters Patent is hereby corrected as shown below:

Title page,
Item [*] Notice, please insert: -- This patent issued on a continued prosecution application filed under 37 C.F.R. 1.53(d), and is subject to the twenty year patent term provisions of 35 U.S.C. 154(a)(2). --.
Item [56], FOREIGN PATENT DOCUMENTS, please insert:
-- Patent Abstracts of Japan, Kokai No. 09-297464
Patent Abstracts of Japan, Kokai No. 04-73658
Patent Abstracts of Japan, Kokai No. 62-103657
Patent Abstracts of Japan, Kokai No. 06-95551
Patent Abstracts of Japan, Kokai No. 62-168161
Patent Abstracts of Japan, Kokai No. 61-231561
Patent Abstracts of Japan, Kokai No. 60-178457
Patent Abstracts of Japan, Kokai No. 60-168156
Patent Abstracts of Japan, Kokai No. 57-158650 --.

Column 4,
Line 14, "stacked" should read -- stacked and --.

Column 7,
Line 18, "above described" should read -- above-desccribed --.

Column 15,
Line 8, "the" (second occurrence) should be deleted; and
Line 10, "a" should be deleted.

Column 29,
Line 35, "bean" shodul read -- beam --.

Signed and Sealed this

Twentieth Day of January, 2004

JON W. DUDAS
*Acting Director of the United States Patent and Trademark Office*